US011140669B2

(12) United States Patent
Takeda et al.

(10) Patent No.: US 11,140,669 B2
(45) Date of Patent: Oct. 5, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Shaozhen Guo, Beijing (CN); Lihui Wang, Beijing (CN); Liu Liu, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/328,756

(22) PCT Filed: Aug. 30, 2017

(86) PCT No.: PCT/JP2017/031152
§ 371 (c)(1),
(2) Date: Feb. 27, 2019

(87) PCT Pub. No.: WO2018/043561
PCT Pub. Date: Mar. 8, 2018

(65) Prior Publication Data
US 2019/0208509 A1    Jul. 4, 2019

(30) Foreign Application Priority Data
Aug. 31, 2016  (JP) .............................. JP2016-170058

(51) Int. Cl.
*H04W 72/04* (2009.01)
*H04W 28/04* (2009.01)
*H04L 1/18* (2006.01)

(52) U.S. Cl.
CPC ......... *H04W 72/042* (2013.01); *H04L 1/1829* (2013.01); *H04W 28/04* (2013.01)

(58) Field of Classification Search
None
See application file for complete search history.

(56) References Cited

U.S. PATENT DOCUMENTS

2016/0205690 A1*  7/2016  Berggren ................ H04L 5/001
                                                                        370/280
2017/0215188 A1*  7/2017  Kim ...................... H04L 1/1854
(Continued)

FOREIGN PATENT DOCUMENTS

WO       2015043667 A1    4/2015

OTHER PUBLICATIONS

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010 (153 pages).
(Continued)

*Primary Examiner* — Scott M Sciacca
(74) *Attorney, Agent, or Firm* — Osha Bergman Watanabe & Burton LLP

(57) ABSTRACT

The present invention is designed so that the transmission of A/Ns can be controlled properly when the reference value for the timing for transmitting signals is controlled in radio base stations and/or user terminals. A user terminal, according to the present invention, has a receiving section that receives a downlink (DL) shared channel, and a control section that controls transmission of retransmission control information in response to the DL shared channel. The control section controls the transmission of the retransmission control information based on a reference value that is configured for timing for transmitting the retransmission control information.

4 Claims, 24 Drawing Sheets

(56) References Cited

U.S. PATENT DOCUMENTS

2018/0054819 A1* 2/2018 Meng .................... H04L 1/0625
2018/0343656 A1 11/2018 Berggren et al.
2019/0069312 A1* 2/2019 Oh ........................ H04W 72/04
2019/0116006 A1* 4/2019 Lunttila ................ H04L 1/1854
2019/0288801 A1* 9/2019 Yang .................... H04L 1/0038

OTHER PUBLICATIONS

NTT Docomo, Inc.; "HARQ/Scheduling timing for FS2 with Shortened processing time for 1ms TTI"; 3GPP TSG RAN WG1 Meeting #86 R1-167367; Gothenburg, Sweden, Aug. 22-26, 2016 (5 pages).
International Search Report issued for PCT/JP2017/031152, dated Oct. 3, 2017 (4 pages).
Written Opinion issued for PCT/JP2017/031152, dated Oct. 3, 2017 (3 pages).
LG Electronics; "Issues on DL HARQ process in case of TDD CA with different UL-DL configurations"; 3GPP TSG RAN WG1 #70bis, R1-124313; San Diego, USA; Oct. 8-12, 2012 (4 pages).
Extended European Search Report issued in counterpart European Patent Application No. 17846565.4, dated Apr. 6, 2021 (6 pages).
Extended European Search Report issued in the counterpart European Patent Application No. 17846565.4, dated Mar. 30, 2020 (8 pages).
Samsung; "Overview of latency reduction operation with subframe TTI for FS2"; 3GPP TSG RAN WG1 Meeting #86, R1-166693; Gothenburg, Sweden, Aug. 22-26, 2016 (5 pages).

* cited by examiner

| UL/DL CONFIGU-RATION | NUMBER OF HARQ PROCESSES | SUBFRAME n | | | | | | | | | |
|---|---|---|---|---|---|---|---|---|---|---|---|
| | | 0 | 1 | 2 | 3 | 4 | 5 | 6 | 7 | 8 | 9 |
| 0 | 4 | - | - | 6 | - | 4 | - | 6 | - | - | 4 |
| 1 | 7 | - | - | 7,6 | 4 | - | - | - | 7,6 | 4 | - |
| 2 | 10 | - | - | 8,7,4,6 | - | - | - | - | 8,7,4,6 | - | - |
| 3 | 9 | - | - | 7,6,11 | 6,5 | 5,4 | - | - | - | - | - |
| 4 | 12 | - | - | 12,8,7,11 | 6,5,4,7 | - | - | - | - | - | - |
| 5 | 15 | - | - | 13,12,9,8,7,5,4,11,6 | - | - | - | - | - | - | - |
| 6 | 6 | - | - | 7 | 7 | 5 | - | - | 7 | 7 | - |

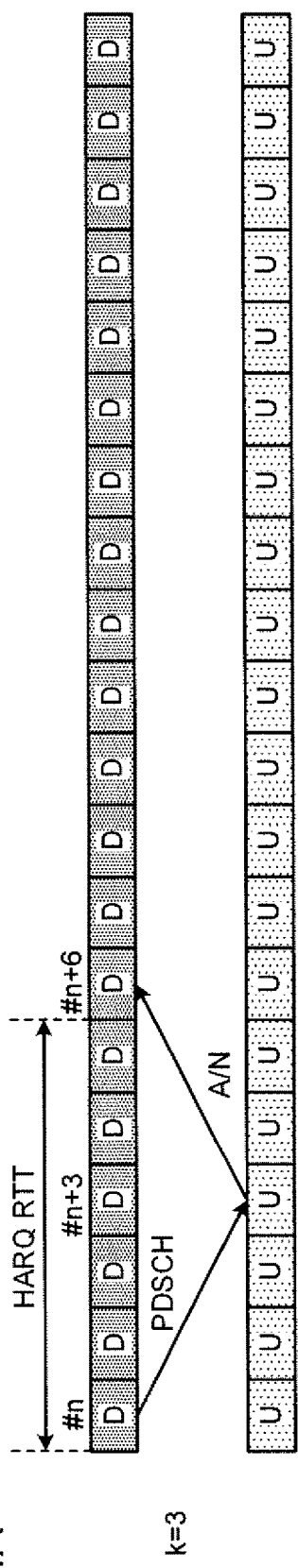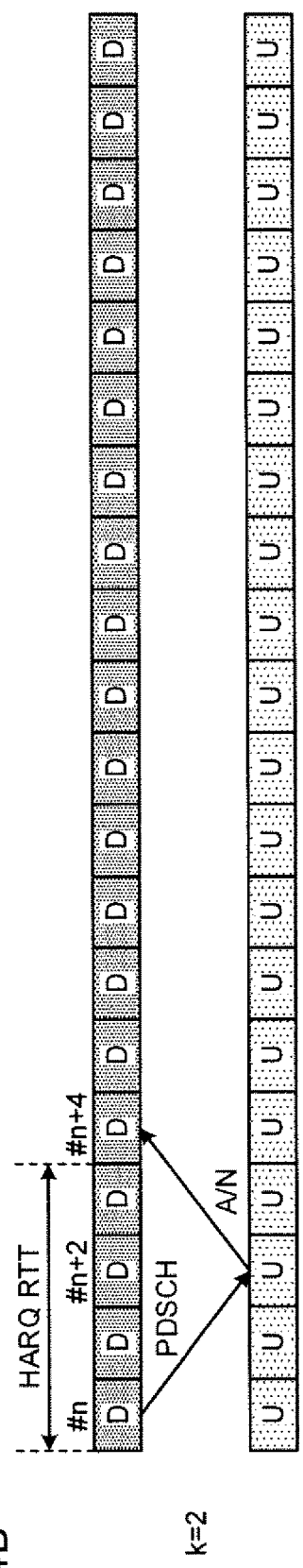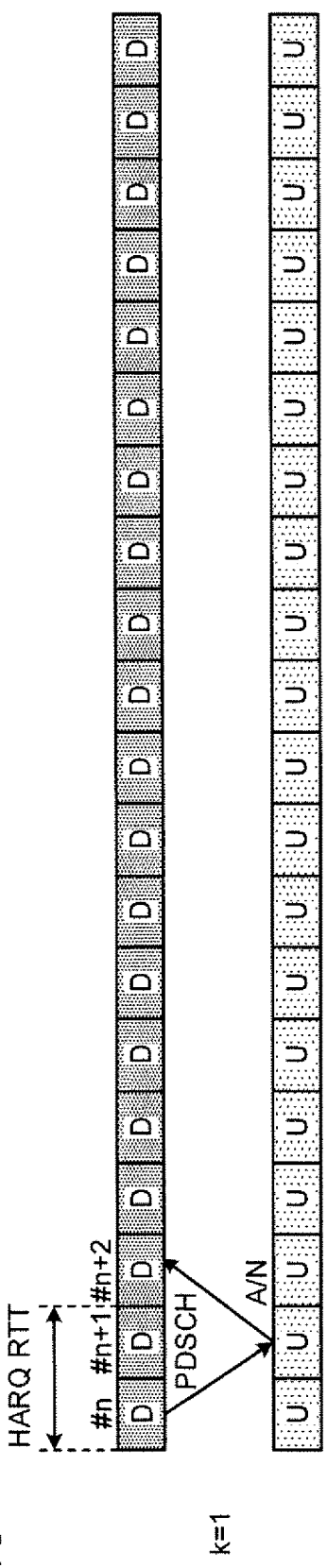

FIG. 5A

| VALUE OF k | NUMBER OF HARQ PROCESSES | BIT LENGTH OF HPN FIELD IN DL DCI |
|---|---|---|
| 1 | 2 | 1 |
| 2 | 4 | 2 |
| 3 | 6 | 3 |
| 4 (CONVENTIONAL) | 8 | 3 |

FIG. 5B

| VALUE OF k | NUMBER OF HARQ PROCESSES | BIT LENGTH OF HPN FIELD IN DL DCI |
|---|---|---|
| 1 | 2 | 3 |
| 2 | 4 | 3 |
| 3 | 6 | 3 |
| 4 (CONVENTIONAL) | 8 | 3 |

| UL/DL CONFIGURA-TION | \ SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | - | 3 | 3 | - | - | - | 3 | 3 |
| 1 | - | - | 6,3 | 3 | - | - | - | 6,3 | 3 | - |
| 2 | - | - | 7,6,4,3 | - | - | - | - | 7,6,4,3 | - | - |
| 3 | - | - | 7,6,5,4,3 | 3 | 3 | - | - | - | - | - |
| 4 | - | - | 11,8,7,6,5,4,3 | 3 | - | - | - | - | - | - |
| 5 | - | - | 12,11,9,8,7,6,5,4,3 | - | - | - | - | - | - | - |
| 6 | - | - | 6,3 | 3 | 3 | - | - | - | 3 | - | k=3 k=3

UL/DL CONFIGURATION 1

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | - | - | - | - | - | - | - | - |
| 1 | - | - | - | 2 | - | - | - | 3,2 | 2 | - |
| 2 | - | - | - | 2 | - | - | - | 6,4,3,2 | 2 | - |
| 3 | - | - | 7,6,5,4,3,2 | 2 | 2 | - | - | - | - | - |
| 4 | - | - | 8,7,6,5,4,3,2 | 2 | - | - | - | - | - | - |
| 5 | - | - | 11,9,8,7,6,5,4,3,2 | - | - | - | - | - | - | - |
| 6 | - | - | 3,2 | 2 | - | - | - | 2 | 2 | - | k=2 k=2

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 2,1 | - | - | - | - | 2,1 | - | - |
| 1 | - | - | 3,2,1 | - | - | - | - | 3,2,1 | - | - |
| 2 | - | - | 4,3,2,1 | - | - | - | - | 4,3,2,1 | - | - |
| 3 | - | - | 7,6,5,4,3,2,1 | - | - | - | - | - | - | - |
| 4 | - | - | 8,7,6,5,4,3,2,1 | - | - | - | - | - | - | - |
| 5 | - | - | 9,8,7,6,5,4,3,2,1 | - | - | - | - | - | - | - |
| 6 | - | - | 3,2,1 | - | - | - | - | 2,1 | - | - | k=1 k=1
UL/DL CONFIGURATION 1

FIG. 10A

| k | | UL/DL CONFIGURATION | | | | | | |
|---|---|---|---|---|---|---|---|---|
| 3 | | 0 | 1 | 2 | 3 | 4 | 5 | 6 |
| | NUMBER OF HPN PROCESSES | 3 | 5 | 8 | 7 | 10 | 13 | 4 |
| | BIT LENGTH OF HPN FIELD | 2 | 3 | 3 | 3 | 4 | 4 | 2 |

FIG. 10B

| k | | UL/DL CONFIGURATION | | | | | | |
|---|---|---|---|---|---|---|---|---|
| 2 | | 0 | 1 | 2 | 3 | 4 | 5 | 6 |
| | NUMBER OF HPN PROCESSES | 2 | 3 | 6 | 7 | 8 | 11 | 3 |
| | BIT LENGTH OF HPN FIELD | 1 | 2 | 3 | 3 | 3 | 4 | 2 |

FIG. 10C

| k | | UL/DL CONFIGURATION | | | | | | |
|---|---|---|---|---|---|---|---|---|
| 1 | | 0 | 1 | 2 | 3 | 4 | 5 | 6 |
| | NUMBER OF HPN PROCESSES | 2 | 3 | 4 | 7 | 8 | 9 | 3 |
| | BIT LENGTH OF HPN FIELD | 1 | 2 | 2 | 3 | 3 | 4 | 2 |

| UL/DL CONFIGURA-TION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | - | 3 | 3 | - | - | - | 3 | 3 |
| 1 | - | - | 6,3 | 3 | - | - | - | 6,3 | 3 | - |
| 2 | - | - | 7,6,4,3 | - | - | - | - | 7,6,4,3 | - | - |
| 3 | - | - | 7,6,5 | 5,4 | 4,3 | - | - | - | - | - |
| 4 | - | - | 11,8,7,6 | 6,5,4,3 | - | - | - | - | - | - |
| 5 | - | - | 12,11,9,8,7,6,5,4,3 | - | - | - | - | - | - | - |
| 6 | - | - | 6 | 4 | 4 | - | - | 6 | 3 | - | k=3

FIG. 11

| UL/DL CONFIGURA-TION | \multicolumn{10}{c}{SUBFRAME n} | | | | | | | | | |
|---|---|---|---|---|---|---|---|---|---|---|
| | 0 | 1 | 2 | 3 | 4 | 5 | 6 | 7 | 8 | 9 |
| 0 | - | - | 2 | 2 | - | - | - | 2 | 2 | - |
| 1 | - | - | 3,2 | 2 | - | - | - | 3,2 | 2 | - |
| 2 | - | - | 6,4,3,2 | - | - | - | - | 6,4,3,2 | - | - |
| 3 | - | - | 7,6,5 | 5,4 | 4,3 | - | - | - | - | - |
| 4 | - | - | 8,7,6,5 | 5,4,3,2 | - | - | - | - | - | - |
| 5 | - | - | 12,11,9,8,7,6,5,4,3,2 | - | - | - | - | - | - | - |
| 6 | - | - | 3 | 3 | 3 | - | - | 2 | 2 | - | k=2

FIG. 12

| k=1 | | SUBFRAME n | | | | | | | | | |
|---|---|---|---|---|---|---|---|---|---|---|---|
| UL/DL CONFIGURA-TION | | 0 | 1 | 2 | 3 | 4 | 5 | 6 | 7 | 8 | 9 |
| | 0 | - | - | 2 | 2 | - | - | - | 2 | 2 | - |
| | 1 | - | - | 2 | 2 | - | - | - | 2 | 2 | - |
| | 2 | - | - | 3,2 | - | - | - | - | 3,2 | - | - |
| | 3 | - | - | 4,3,2,1 | 5,4 | 4,3 | - | - | - | - | - |
| | 4 | - | - | 7,6,5 | 5,4,3,2 | - | - | - | - | - | - |
| | 5 | - | - | 8,7,6,5 | - | - | - | - | - | - | - |
| | 6 | - | - | 9,8,7,6,5,4,3,2,1 | 3 | 3 | - | - | 2 | 2 | - |

FIG. 13

| VALUE OF GIVEN FIELD IN DCI | VALUE OF k |
|---|---|
| 00 | 4 |
| 01 | 1 |
| 10 | 2 |
| 11 | 3 |

FIG. 16

| UL/DL CONFIGURA-TION | k=1 | k=2 | k=3 | k=4 | HPN value for k=1 | HPN value for k=2 | HPN value for k=3 | HPN value for k=4 |
|---|---|---|---|---|---|---|---|---|
| 0 | 2 | 2 | 3 | 4 | 0-1 | 0-1 | 0-2 | 12-15 |
| 1 | 3 | 3 | 5 | 7 | 0-2 | 0-2 | 0-4 | 9-15 |
| 2 | 4 | 6 | 8 | 10 | 0-3 | 0-5 | 0-7 | 8-15(8) |
| 3 | 7 | 7 | 7 | 9 | 0-6 | 0-6 | 0-6 | 7-15 |
| 4 | 8 | 8 | 10 | 12 | 0-7 | 0-7 | 0-9 | 10-15(5) |
| 5 | 9 | 11 | 13 | 15 | 0-8 | 0-10 | 0-12 | 13-15(3) |
| 6 | 3 | 3 | 4 | 6 | 0-2 | 0-2 | 0-3 | 10-15 |

FIG. 17

| UL/DL CONFIGURA-TION | k=1 | k=2 | k=3 | k=4 | HPN value for k=1 | HPN value for k=2 | HPN value for k=3 | HPN value for k=4 |
|---|---|---|---|---|---|---|---|---|
| 0 | 2 | 2 | 3 | 4 | 0-1 | 2-3 | 4-6 | 7-10 |
| 1 | 3 | 3 | 5 | 7 | 0-2 | 3-5 | - | 6-12 |
| 1 | 3 | 3 | 5 | 7 | 0-2 | - | 3-7 | 8-14 |
| 6 | 3 | 3 | 4 | 6 | 0-2 | 3-5 | - | 6-11 |
| 6 | 3 | 3 | 4 | 6 | 0-2 | - | 3-6 | 7-12 |

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and/or the like).

In existing LTE systems (for example, LTE Rel. 8 to 13), downlink (DL) communication and/or uplink (UL) communication are carried out by using 1-ms transmission time intervals (TTIs) (also referred to as "subframes" and/or the like). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), frequency division duplex (FDD) and time division duplex (TDD) are supported as duplex schemes. FDD is a scheme to assign different frequencies to DL and UL, and is also referred to as "frame structure (FS) type 1 (FS 1)." TDD is a scheme to switch between DL and UL over time in the same frequency, and is also referred to as "frame structure type 2 (FS 2)." In TDD, communication is carried out based on UL/DL configurations, which define the formats of UL subframes and DL subframes in radio frames.

Also, in existing LTE systems (for example, LTE Rel. 8 to 13), the timing (also referred to as "DL HARQ timing" and/or the like) for transmitting retransmission control information (for example, ACK (ACKnowledgement) or NACK (Negative ACK), A/N, HARQ-ACK and so on, which hereinafter will be collectively referred to as "A/N") in response to a DL shared channel (for example, a physical downlink shared channel, which hereinafter will be referred to as "PUSCH," for example) is controlled by taking into account the signal processing time and the like in user terminals and/or radio base stations, and on assumption that the reference value for the timing for transmission is fixed at 4 ms.

For example, where FDD is used in existing LTE systems (for example, LTE Rel. 8 to 13), when a PDSCH is received in subframe #n, an A/N in response to this PDSCH is transmitted (feedback) in subframe #n+4 on assumption that the processing time of the PDSCH and/or others in the user terminal takes 4 ms. Also, in TDD, when a PDSCH is received in DL subframe #n, an A/N in response to this PDSCH is transmitted in subframe #n+4 or a later UL subframe on assumption that the processing time of the PDSCH and/others in the user terminal takes 4 ms.

Similarly, in existing LTE systems (for example, LTE Rel. 8 to 13), the timing (also "UL HARQ timing" and/or the like) for transmitting A/Ns in response to a UL shared channel (for example, a physical uplink shared channel, which hereinafter will be referred to as "PUSCH"), is also controlled on assumption that the reference value for the timing for transmitting signals in user terminals and/or radio base stations is fixed at 4 ms.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, LTE Rel. 14, 15 and later versions, 5G, NR and so forth) are required to reduce latency (also referred to as "latency reduction") in order to provide communication services having strict requirements on latency, such as URLLC. Latency as used herein collectively refers to the latency in the propagation time of signals (propagation delay) and the latency in the processing time of signals (processing delay).

As for the method of reducing these latencies, it may be possible to shorten the very processing unit for use for communication control (for example, scheduling and/or retransmission control) by introducing a new TTI (short TTI) that is shorter than a 1-ms subframe (TTI).

Meanwhile, even when 1-ms subframes are kept as processing units for controlling communication, it is still desirable to reduce latency. When keeping 1-ms subframes as processing units for communication control, it may be possible to configure the reference value for the timing for transmission short (for example, shorter than 4 ms) and control the time it takes to process signals in radio base stations and/or user terminals (the processing time, parameters related to the processing time, and so forth).

However, as mentioned earlier, in existing LTE systems (for example, LTE Rel. 8 to 13), the timing for transmitting A/Ns is controlled by setting fixing the reference value for the timing for transmission at 4 ms. It then follows that, in future radio communication systems where this reference value can be controlled to be other than 4 ms, using the same A/N transmission timings as in existing LTE systems might result in an inability to control the transmission A/Ns properly.

The present invention has been made in view of the above, and it is therefore an object of the present invention to provide a user terminal and a radio communication method, whereby the transmission of A/Ns can be controlled properly even when the reference value for the timing for transmitting signals is controlled in the radio base station and/or the user terminal.

Solution to Problem

A user terminal, according to one aspect of the present invention, has a receiving section that receives a downlink (DL) shared channel, and a control section that controls transmission of retransmission control information in response to the DL shared channel. The control section controls the transmission of the retransmission control information based on a reference value that is configured for timing for transmitting the retransmission control information.

Advantageous Effects of Invention

According to the present invention, it is possible to control the transmission of A/Ns properly when the reference value for the timing for transmitting signals is controlled in radio base stations and/or user terminals.

BRIEF DESCRIPTION OF DRAWINGS

FIGS. 4A to 4C are diagrams to show examples of A/N transmission timings according to a first aspect of the present invention;
FIGS. 5A and 5B are diagrams to show examples of the numbers of HARQ processes and the numbers of HPN field bits, according to the first aspect;
FIGS. 10A to 10C are diagrams to show examples of the numbers of HARQ processes and the numbers of HPN field bits, according to the second aspect;
FIG. 11 is a diagram to show other examples of A/N transmission timings when k=3, according to the second aspect;
FIG. 12 is a diagram to show other examples of A/N transmission timings when k=2, according to the second aspect;
FIG. 13 is a diagram to show other examples of A/N transmission timings when k=1, according to the second aspect;
FIG. 16 is a diagram to show examples of dynamic and explicit signaling according to the third aspect;
FIG. 17 is a diagram to show an example of dynamic and explicit signaling according to the third aspect;
FIG. 18 is a diagram to show other examples of dynamic and explicit signaling according to the third aspect.

DESCRIPTION OF EMBODIMENTS

Existing LTE systems (LTE Rel. 8 to 13) support hybrid automatic repeat request (HARQ) in order to prevent degradation of communication quality between user terminals (UE (User Equipment)) and radio base stations (eNode B (eNode B)).

For example, in the DL of existing LTE systems, a user terminal transmits an A/N in response to a PDSCH based on the result of the receipt of the PDSCH, by using a PUSCH or a PUCCH. A radio base station controls the transmission of the PDSCH (including initial transmission and/or retransmission) based on the A/N from the user terminal.

Also, in the UL of existing LTE systems, the user terminal transmits a PUSCH, which is scheduled by a UL grant from the radio base station. Based on the result of the receipt of the PUSCH, the radio base station transmits an A/N in response to the PUSCH by using a retransmission control channel (for example, a PHICH (Physical Hybrid-ARQ Indicator CHannel)). The user terminal controls the transmission of the PUSCH (including initial transmission and/or retransmission) based on the A/N from the radio base station.

In the DL and/or the UL (hereinafter also referred to as "DL/UL") of existing LTE systems, the timing for transmitting an A/N (hereinafter also referred to as "DL/UL HARQ timing") is controlled to come a predetermined period of time after the subframe in which data is transmitted and received, based on a predetermined reference value for the timing for transmission.

Also, in the DL of existing LTE systems, the timing for transmitting an A/N in response to a PDSCH is controlled to come a predetermined period of time after the subframe in which the PDSCH is received. For example, in FDD, an A/N in response to a PDSCH is transmitted in the subframe that is located 4 ms after the subframe in which the PDSCH is received.

Figure 1:
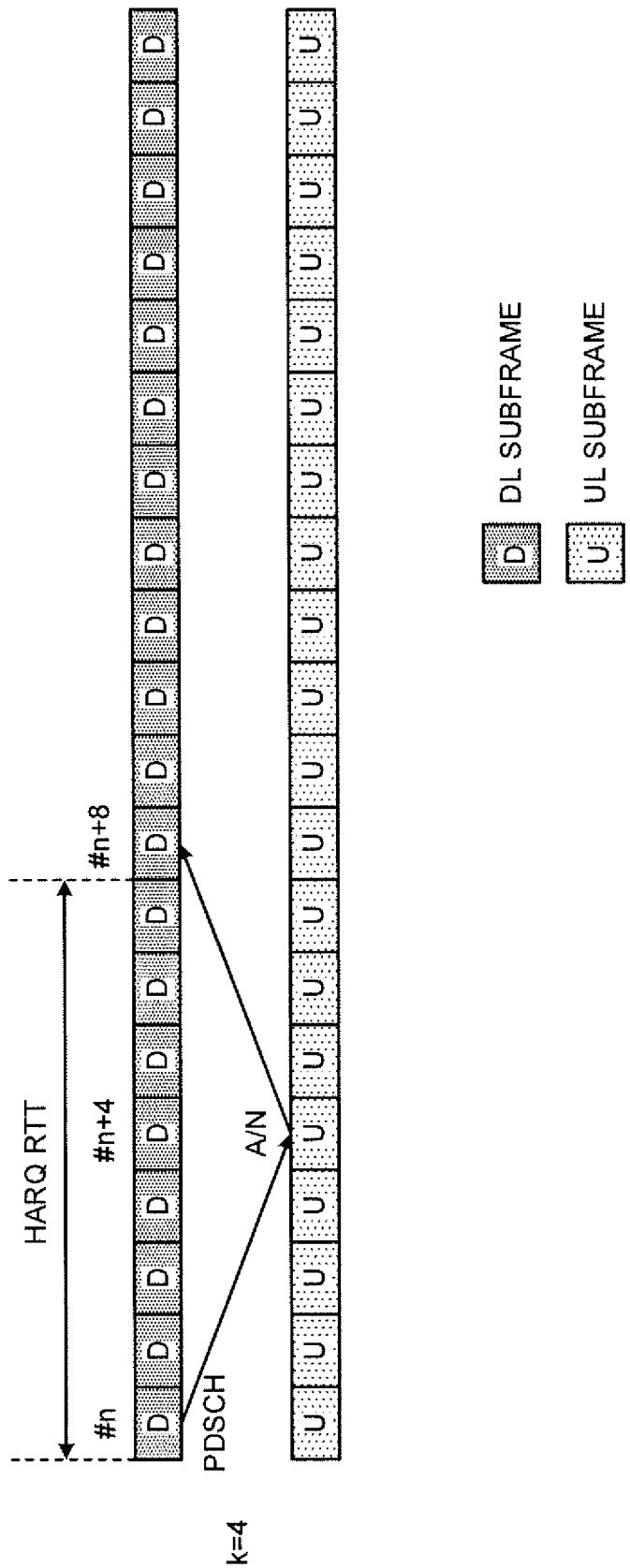
FIG. 1 is a diagram to show examples of A/N transmission timings in FDD.

FIG. 1 is a diagram to show examples of A/N transmission timings in FDD. As shown in FIG. 1, in FDD, when a user terminal receives a PDSCH in subframe #n, the user terminal transmits an A/N in response to the PDSCH, to the radio base station, in subframe #n+4, which is located 4 ms later. Normally, when an A/N is received in subframe #n+4, a radio base station retransmits the HARQ process or performs initial transmission in or after subframe #n+8, which is located 4 ms later (the radio base station may do so before subframe #n+8).

Also, in HARQ, retransmission of data (transport block (TB) or code block (CB)) is controlled using processes (HARQ processes) as processing units. In a HARQ process of a given number (HARQ process number (HPN)), the same data keeps being retransmitted until an ACK is received. Also, in one subframe, one HARQ process is used. By implementing a plurality of HARQ processes in parallel, it is possible to transmit the data of the next HARQ process without waiting for an A/N in response to the previous HARQ process, so that the latency time is reduced.

For example, in FIG. 1, the HARQ process number (HPN) that is used to transmit a PDSCH in subframe #n becomes available again in subframe #n+8, which is 8 ms later. In this way, the time it takes until the same HPN becomes available again (that is, the time it takes after data is transmitted until retransmission or initial transmission is allowed depending on the result of the receipt the data) is also referred to as "round trip time" (or "RTT," "HARQ RTT," and so on).

As shown in FIG. 1, when FDD is used in existing LTE systems, the HARQ RTT is eight subframes (8 ms). Also, since the HARQ RTT is comprised of eight subframes, the maximum number of HARQ processes (also referred to as "the number of HARQ processes") is eight.

Meanwhile, when TDD is used in existing LTE systems, an A/N in response to a PDSCH is transmitted in a UL subframe that is located 4 ms or more after the subframe in which the PDSCH is received on assumption that the time it takes for a user terminal to process this PDSCH is substantially the same as in FDD. The timing for transmitting A/Ns in TDD is determined based on UL/DL configurations for TDD.

Figure 2:
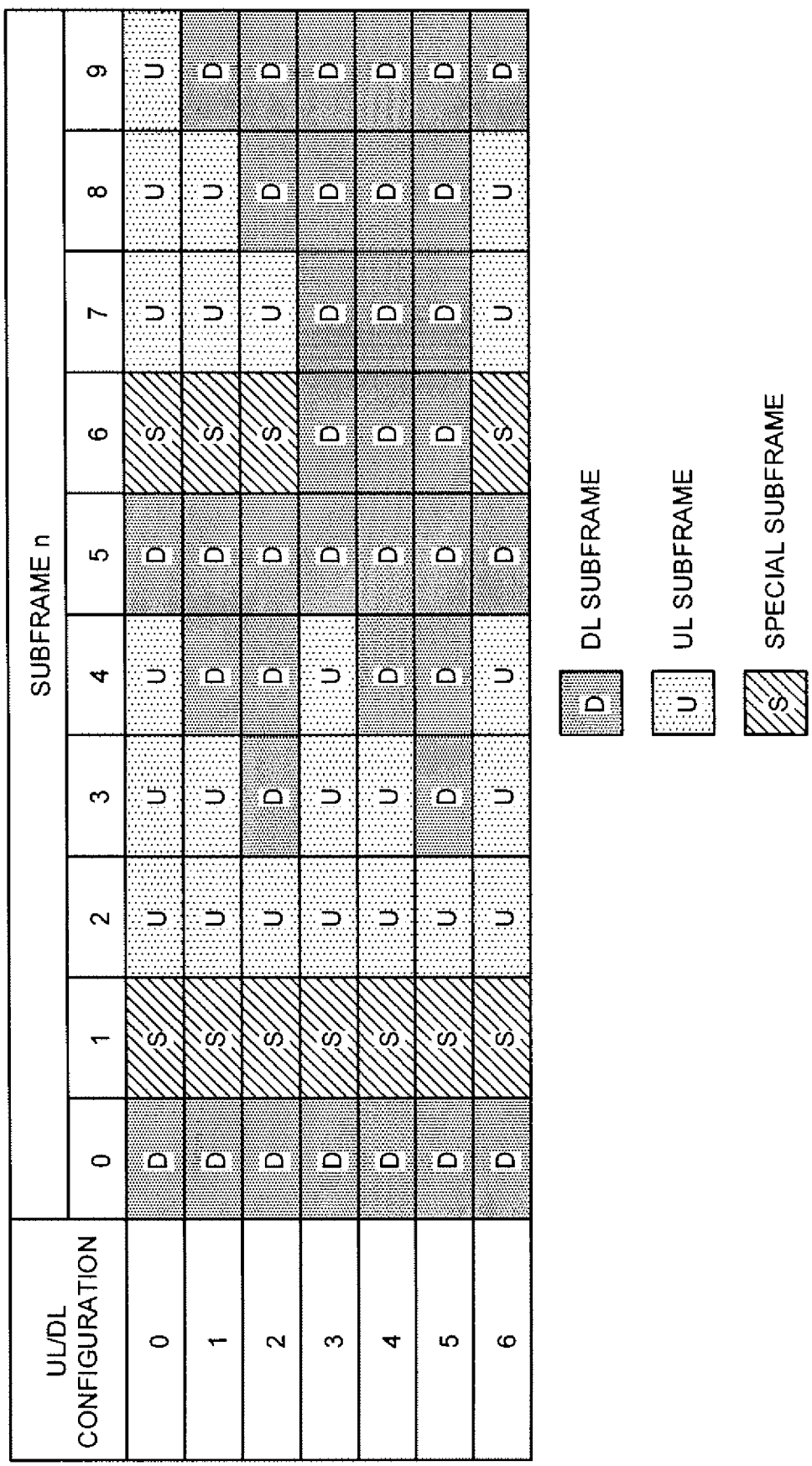
FIG. 2 is a diagram to show examples of UL/DL configurations.

FIG. 2 is a diagram to show examples of UL/DL configurations. As shown in FIG. 2, for TDD in existing LTE systems, seven frame structures—namely, UL/DL configurations 0 to 6—are defined, with varying ratios of UL subframes and DL subframes. Subframes #0 and #5 are allocated to the downlink, and subframe #2 is allocated to the uplink. Also, in UL/DL configurations 0, 1, 2, and 6, the point of change from DL subframes to UL subframes comes in a cycle of 5 ms, and, in UL/DL configurations 3, 4 and 5, the point of change from DL subframes to UL subframes comes in a cycle of 10 ms.

In UL/DL configurations 2, 3, 4 and 5 of FIG. 2, the ratio of DL subframes to UL subframes is configured to be relatively large (DL-centric). Note that a special subframe is a subframe for switching between DL and UL, and can be used primarily in DL communication. Hereinafter, a DL subframe and/or a special subframe will be referred to as a "DL/special subframe."

Figures 3A, 3B:
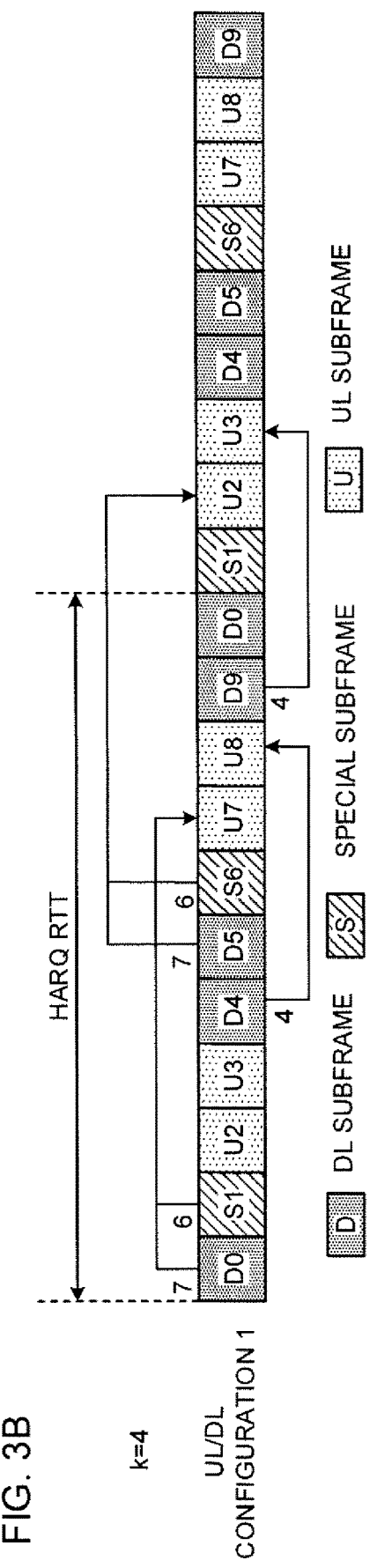
FIGS. 3A and 3B are diagrams to show examples of A/N transmission timings in TDD.

FIG. 3 are diagrams to show examples of A/N transmission timings in TDD. FIG. 3A shows the relationship between the DL/special subframe in which the PDSCH is received and the UL subframe in which the A/N in response to the PDSCH is transmitted for each UL/DL configuration.

To be more specific, FIG. 3A identifies in which DL/special subframe the PDSCH, in response to which an A/N is transmitted in each UL subframe #n (0≈n≤9) of each UL/DL configuration, was received. FIG. 3A shows the value of k in the event each UL subframe #n (0≈n≤9) of each UL/DL configuration transmits an A/N in response to the PDSCH received in DL/special subframe #n−k, which is located k subframes before.

For example, given the value of k defined in UL/DL configuration 1 in FIG. 3A, as shown in FIG. 3B, UL subframe #7 transmits A/Ns in response to the PDSCHs received in DL subframe #0 and special subframe #1, which are located seven subframes and six subframes before. Also, UL subframe #8 transmits an A/N in response to the PDSCH received in DL subframe #4, which is located four subframes before. UL subframe #2 transmits A/Ns in response to the PDSCHs received in DL subframe #5 and special subframe #6, which are located seven subframes and six subframes before. UL subframe #3 transmits an A/N in response to the PDSCH received in DL subframe #9, which is located four subframes before.

In this manner, in TDD, a UL subframe may not be present 4 ms after a PDSCH is received in DL/special subframe #n. Therefore, in the above table, the value of k is configured so that an A/N in response to a PDSCH is transmitted in a UL subframe that is located four or more subframes after the subframe in which this PDSCH is received. Also, A/Ns in response to PDSCHs received in one or more DL/special subframes can be bundled and transmitted in a single UL subframe.

Also, in TDD, the HARQ RTT and the maximum number of HARQ processes are configured to values to suit the UL/DL configuration, not fixed values (8) as in FDD. For example, as shown in FIG. 3B, in UL/DL configuration 1, an A/N in response to the PDSCH of DL subframe #0 is transmitted in UL subframe #7, and, based on this A/N, this PDSCH is retransmitted in special subframe #1, which is located 4 ms after UL subframe #7.

In the case of FIG. 3B, the same HPN becomes available again in special subframe #1, which is located eleven subframes after DL subframe #0, so that the HARQ RTT is ten subframes. In this way, it is possible to say that, in TDD, the HARQ RTT is equal to the maximum value of k in each UL/DL configuration (seven in UL/DL configuration 1), plus four subframes. Also, the maximum number of HARQ processes is equal to the number of UL subframes in the HARQ RTT, and, as shown in FIGS. 3A and 3B, the maximum number of HARQ processes in UL/DL configuration 1 is seven. The HARQ RTT and the number of HARQ processes in other UL/DL configurations are also configured likewise.

As described above, in existing LTE systems (Rel. 13 or earlier versions), the timing for transmitting A/Ns is controlled with fixed values, based on 4 ms (as a reference value).

Now, future radio communication systems (for example, LTE Rel. 14, 15 and later versions, 5G, NR, etc.) are required to reduce latency in order to provide communication services with strict requirements on latency, such as URLLC. Latency as used herein collectively refers to the latency in the propagation time of signals (propagation delay) and the latency in the processing time of signals (processing delay).

As for the method of reducing these latencies, it may be possible to shorten the very processing unit for use for communication control (for example, scheduling and/or retransmission control) by introducing a new TTI (short TTI) that is shorter than a 1-ms subframe (TTI).

Meanwhile, even when 1-ms subframes are kept as processing units for controlling communication, it is still desirable to reduce latency. This is because, if processing units for communication control are kept, existing channel formats (for example, PDSCH, DL control channels (PDCCH (Physical Downlink Control CHannel), EPDCCH (Enhanced Physical Downlink Control CHannel) and so on), PUSCH, PUCCH and/or other channels) can be reused.

When keeping 1-ms subframes as processing units for communication control, it may be possible to shorten the time it takes to process signals in radio base stations and/or user terminals, in order to reduce latency.

However, as mentioned earlier, heretofore, in existing LTE systems (for example, LTE Rel. 8 to 13), the timing for transmitting A/Ns has been controlled based on predetermined values, with 4 ms being the reference value. Therefore, if the same A/N transmission timing as in existing LTE systems is applied to future radio communication systems where the processing time is likely to be significantly shorter than in existing LTE systems, there is a possibility that latency cannot be reduced adequately.

So, the present inventors have searched for a method that would control the transmission of A/Ns properly, by presuming radio base stations and/or user terminals in which the processing time is shorter than in existing LTE systems, and arrived at the present invention. To be more specific, the present inventors have come up with the idea of controlling the transmission of A/Ns properly by controlling the timing for transmitting A/Ns based on reference values (for example, k) that are configured based on processing time and/or others.

Now, embodiments of the present invention will be described below in detail. In the following embodiments, a user terminal receives a DL shared channel (hereinafter also referred to as a "DL data channel," "DL data," "PDSCH," and/or the like) and controls the transmission of retransmission control information (for example, A/Ns) in response to the PDSCH. Also, the user terminal controls the transmission of A/N based on a reference value that is configured for the timing for transmission. This reference value may be the processing time, a parameter related to the processing time, and/or the like.

Furthermore, the herein-contained embodiments can be applied to FDD and/or TDD. With a first aspect of the present invention, how to control the timing for A/N transmission in response to the PDSCH in FDD will be described below. Also, with a second aspect of the present invention, control of the timing for PUSCH scheduling in TDD will be described below. Furthermore, with a third aspect of the present invention, control for switching the reference value for the timing for signal transmission in FDD and/or TDD will be described below.

(First Aspect)

With the first aspect of the present invention, the timing for transmitting A/Ns in response to PDSCH in FDD will be described below. In the first aspect, a user terminal controls the reference value (k), which is calculated based on the processing time of signals in the user terminal and/or the radio base station, to be shorter than conventional 4 ms, and controls the timing for transmitting A/Ns based on this reference value.

<Timing for A/N Transmission>

FIG. 4 are diagrams to show examples of A/N transmission timings according to the first aspect. For example, in FIG. 4, when a user terminal receives a PDSCH in subframe #n, the user terminal transmits an A/N in response to this PDSCH in subframe #n+k, which is located the reference value k (k=1, 2 or 3) ms after this subframe #n.

Also, based on the A/N of subframe #n+k, the radio base station can control the transmission of the PDSCH (including initial transmission or retransmission) in subframe #n+2k, which is located k ms after subframe #n+k (this subframe #n+2k is by no means limiting, and can be a later subframe).

To be more specific, when the radio base station receives an ACK in subframe #n+k, the radio base station performs initial transmission of a PDSCH in or after subframe #n+2k. The downlink control information (also referred to as "DCI," "DL DCI," "DL assignment," and/or the like) that allocates this PDSCH may contain information to indicate that this is initially transmitted data (for example, a toggled new data indicator (NDI), and/or the same HARQ process number (HPN) as that of subframe #n).

Meanwhile, when the radio base station receives a NACK in subframe #n+k, the radio base station retransmits the PDSCH of subframe #n in or after subframe #n+2k. The DL DCI that allocates this PDSCH may contain information to indicate this is retransmitted data (for example, an untoggled NDI and the same HPN as that of subframe #n).

When the user terminal detects DL DCI for the user terminal in or after subframe #n+2k and the NDI in this DL DCI is not toggled, the user terminal checks the HPN in the DL DCI, and combines the data of the same HPN stored in the user terminal's soft buffer and the received data (soft combining).

FIG. 4A shows an example of k=3. In FIG. 4A, the user terminal transmits an A/N in response to the PDSCH received in subframe #n, in subframe #n+3. Based on the A/N received in subframe #n+3, the radio base station retransmits the PDSCH or performs initial transmission of a PDSCH in or after subframe #n+6, which is located three subframes later. Therefore, the HARQ RTT is six subframes.

FIG. 4B shows an example of k=2. In FIG. 4B, the user terminal transmits an A/N in response to the PDSCH received in subframe #n, in subframe #n+2. Based on the A/N received in subframe #n+2, the radio base station retransmits the PDSCH or performs initial transmission of a PDSCH in or after subframe #n+4, which is located two subframes later. Therefore, the HARQ RTT is four subframes.

FIG. 4C shows an example of k=1. In FIG. 4C, the user terminal transmits an A/N in response to the PDSCH received in subframe #n, in subframe #n+1. Based on the A/N received in subframe #n+1, the radio base station retransmits the PDSCH or performs initial transmission of a PDSCH in or after subframe #n+2, which is located one subframe later. Therefore, the HARQ RTT is two subframes.

<Maximum Number of HARQ Processes>

As shown in FIGS. 4A to 4C, if, in FDD, the timing A/N transmission is controlled based on a reference value k that is shorter than 4 ms of existing LTE systems (for example, k=1, 2 or 3 (ms)), the HARQ RTT becomes shorter in accordance with this reference value k. Therefore, the maximum number of HARQ processes can be controlled based on this reference value k. To be more specific, the smaller this reference value k, the smaller the maximum number of HARQ processes may be configured.

For example, as shown in FIG. 4A, in the event of k=3, the HARQ RTT is six subframes, and so the maximum number of HARQ processes may be six. Also, as shown in FIG. 4B, in the event of k=2, the HARQ RTT is four subframes, and so the maximum number of HARQ processes may be four. In the event of k=1, since the HARQ RTT is two subframes, the maximum number of HARQ processes may be two.

When the maximum number of HARQ processes is controlled depending on the reference value k, the number of HPN field bits (bit length) in DL DCI may be a value to match the maximum number of HARQ processes or may be a fixed value (for example, three bits, which is the same as the number of HPN field bits when FDD is used in existing LTE systems). Here, the HPN field refers to a field in which information representing the HPN is stored.

FIG. 5 is a diagram to show examples of the numbers of HPN field bits according to the first aspect. When the reference value k becomes smaller, the maximum number of HARQ processes also become smaller, so that the number of HPN field bits (bit length) in DL DCI may be reduced to suit the maximum number of HARQ processes, as shown in FIG. 5A. In this case, the overhead due to DL DCI can be reduced.

Note that the number of bits (bit length) of the HPN field included in DL DCI that is transmitted and received in a common search space of the PDCCH may be a fixed value (for example, three). In this case, the payload of the DL DCI transmitted and received in the common search space does not change, so that, even during periods in which the value of k is changed by higher layer signaling such as RRC signaling, communication can be continued by using DL DCI in the common search space.

Alternatively, as shown in FIG. 5B, the number of bits of the HPN field in DL DCI may be a fixed value (for example, three), regardless of the maximum number of HARQ processes. In this case, existing DL DCI formats can be reused. In addition, when, by making the value of k less than four, a value is indicated as being no longer available for use (for example, HARQ process 6, 7 and/or others), the user terminal can judge that the user terminal has failed to receive the DL DCI corresponding to this value, and transmit a NACK or DTX.

<Soft Buffer Size>

As described above, when the maximum number of HARQ processes is controlled depending on the reference value k, the user terminal may control the soft buffer size (the number of bits) per HARQ process based on the maximum number of HARQ processes. To be more specific, the user terminal may make the software buffer size per HARQ process a variable size that changes with the maximum number of HARQ processes, or a fixed size that does not change with the maximum number of HARQ processes.

Here, the soft buffer refers to the buffer for temporarily saving received data that has failed to be decoded. The soft buffer saves received data (TB or CB) on a per HARQ process basis. The user terminal combines retransmission data of the same HARQ process with received data (soft combining), and, when the decoding succeeds, removes the data that is saved.

For example, the user terminal stores $n_{SB}$ bits of received data, represented by following equation 1, in the soft buffer, for each HARQ process:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right)$$ (Equation 1)

Here, C is the number of CBs given by dividing the TB into one or more. $N^{DL}$ cells is the number of serving cells configured (including the master cell group (MCG) and secondary cell groups (SCGs) in the event dual connectivity is used). $K_{MIMO}$ is a value (for example, 1 or 2) that is configured depending on the transmission mode of the PDSCH. MDL_HARQ is the maximum number of DL HARQ processes. $M_{limit}$ is eight in existing LTE systems. $N'_{soft}$ is the total number of soft channel bits (the total number of bits of received data that can be stored in the soft buffer). Furthermore, $N_{cb}$ is the number of bits per CB.

FIG. 6 is a diagram to show examples of soft buffers according to the first aspect. FIGS. 6A to 6D show the received data corresponding to each HARQ process stored in the soft buffer according to the above equation 1. As shown in FIGS. 6A to 6D, according to equation 1, the soft buffer may be partitioned based on the maximum number of HARQ processes of the user terminal.

Figure 6A:
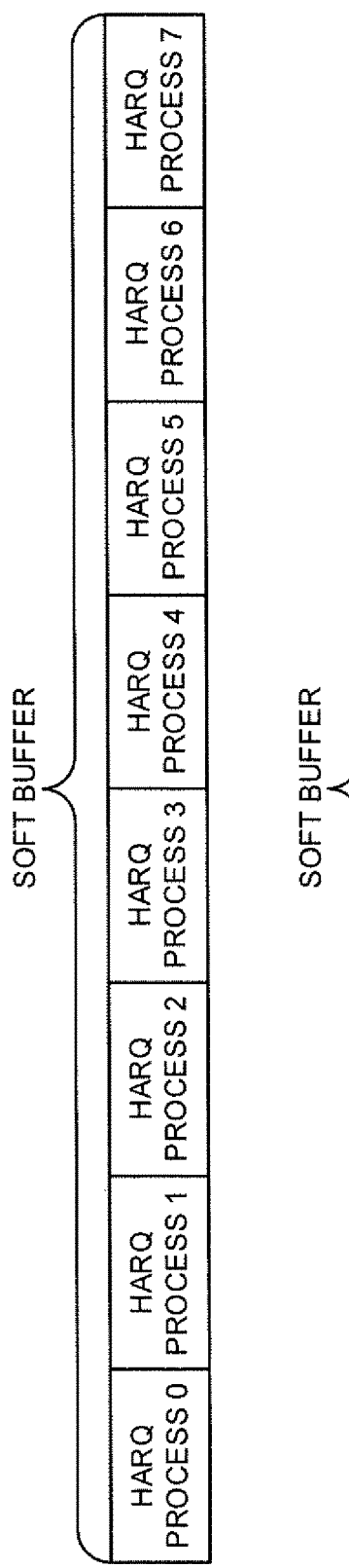
FIGS. 6A to 6D are diagrams to show examples of soft buffers according to the first aspect.
Figure 6B:
Figure 6C:
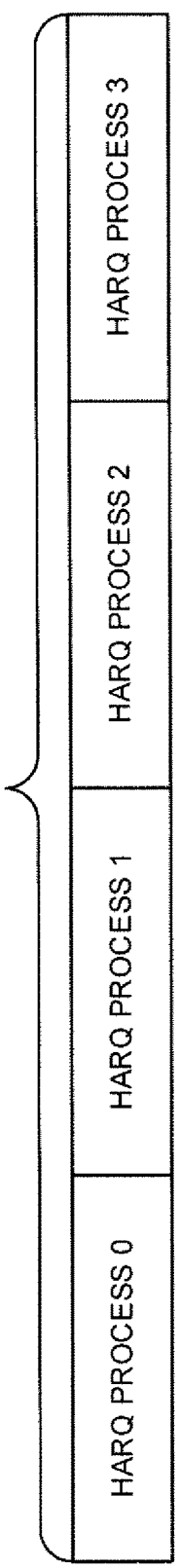
Figure 6D:
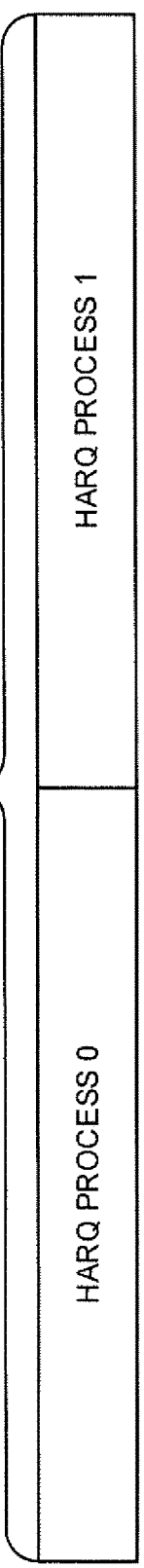

FIG. 6A shows a case where, as in existing LTE systems, a maximum of eight HARQ processes are used and the soft buffer is partitioned into eight. Meanwhile, FIGS. 6B, 6C, and 6D show cases where up to six, four and two HARQ processes are used, and where the soft buffer is partitioned into six, four and two, respectively.

As shown in FIGS. 6A to 6D, when the soft buffer is partitioned based on the maximum number of HARQ processes, the smaller the maximum number of HARQ processes, the greater the number of received data bits per HARQ process that can be stored in the soft buffer. Therefore, by controlling the maximum number of HARQ processes to be smaller based on the reference value k, it is possible to improve the received quality (that is, improve the HARQ gain) after combining (soft combining).

Now, according to the first aspect of the present invention described above, when the reference value k is controlled to be shorter than 4 ms in FDD, the transmission of A/Ns can be controlled properly based on transmission timings that are determined based on this reference value k.

Also, according to the first aspect, the reference value k used to control the timing for PUSCH scheduling is lowered, so that latency can be reduced while keeping subframes (1-ms TTIs) as processing units in communication control. In addition, since the maximum number of HARQ processes can be reduced with the lowering of the reference value k, the overhead of DL DCI can be reduced.

(Second Aspect)

With a second aspect of the present invention, the timing for transmitting A/Ns in response to PDSCH in TDD will be described below. According to the second aspect, a user terminal controls the reference value k to be shorter than conventional 4 ms, and controls the timing transmitting A/Ns based on this reference value k and UL/DL configurations.

To be more specific, when a PDSCH is received in DL/special subframe #n−k' that is located the above reference value k or more before UL subframe #n (for example, the nearest DL/special subframe located the reference value k or more before, but this is not limiting), an A/N in response to this PDSCH may be transmitted in UL subframe #n. In other words, when a PDSCH is received in DL/special subframe #n, an A/N in response to this PDSCH may be transmitted in UL subframe #n+k', which is located the reference value k or more later (for example, the nearest DL/special subframe that is located the reference value k or more later).

Here, the value of k' indicating the timing for transmitting the A/N may be determined based on the reference value k and the UL/DL configuration.

<Timing for Transmitting A/Ns>

FIG. 7 to FIG. 9 are diagrams to show examples of A/N transmission timings according to the second aspect. In FIG. 7 to FIG. 9, a user terminal transmits, in UL subframe #n, an A/N in response to the PDSCH that has been received in nearest DL/special subframe #n−k', which is, located the reference value k or more before UL subframe #n. FIG. 7, FIG. 8 and FIG. 9 show cases where the reference value k is 3 ms, 2 ms and 1 ms, respectively.

Figures 7A, 7B:
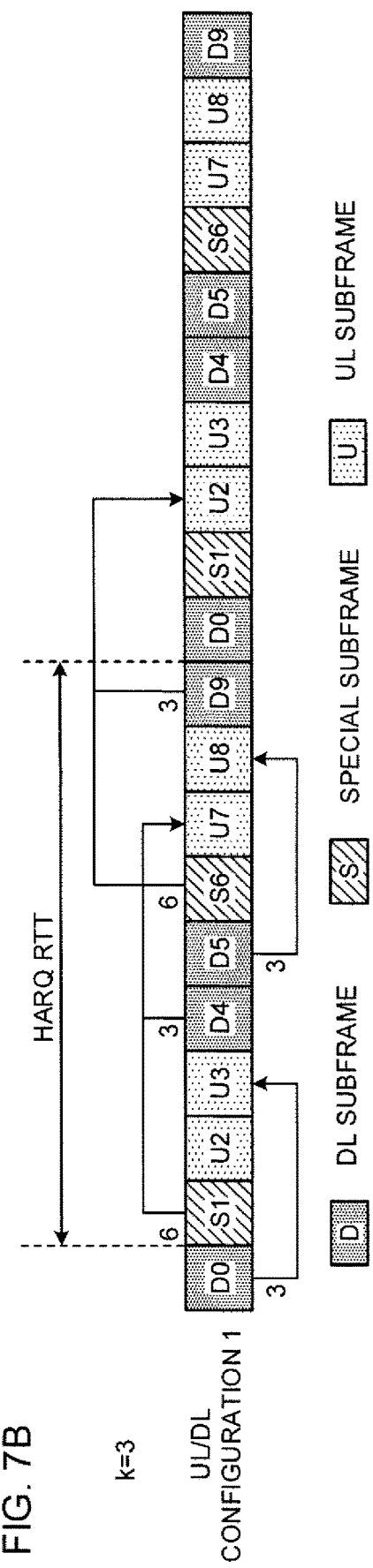
FIGS. 7A and 7B are diagrams to show examples of A/N transmission timings when k=3, according to a second aspect of the present invention.
Figures 8A, 8B:
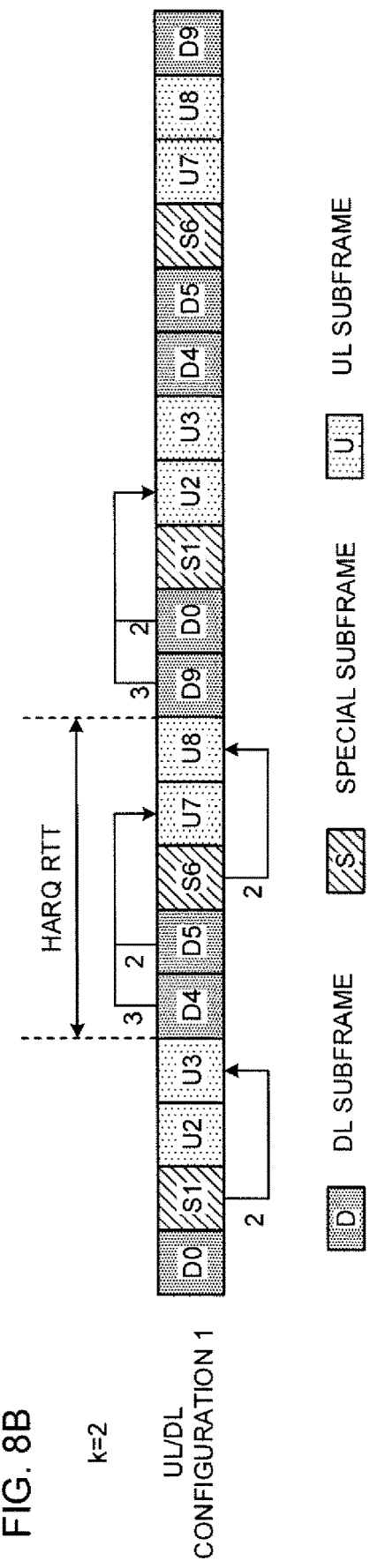
FIGS. 8A and 8B are diagrams to show examples of A/N transmission timings when k=2, according to the second aspect.
Figures 9A, 9B:
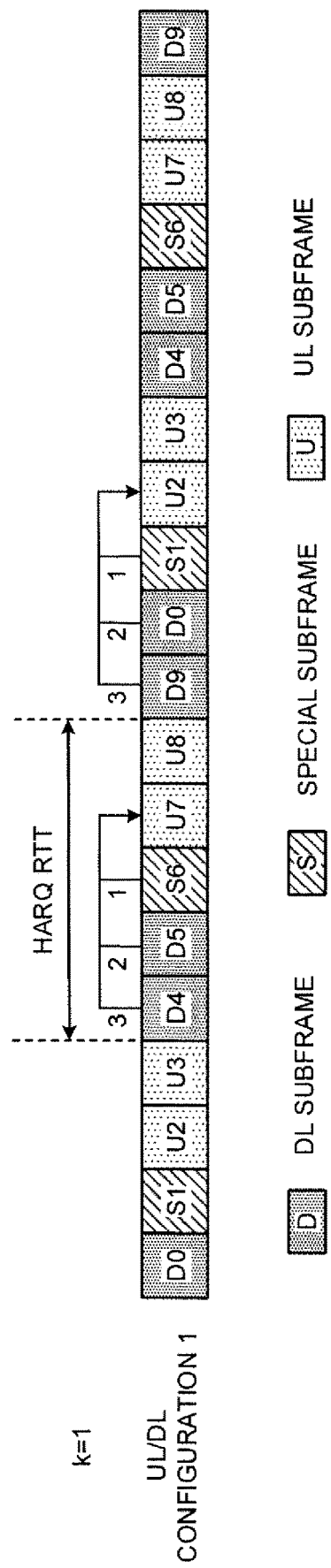
FIGS. 9A and 9B are diagrams to show examples of A/N transmission timings when k=1, according to the second aspect.

The tables of FIG. 7A, FIG. 8A and FIG. 9A each show which DL/special subframe's PDSCH the A/N in each UL subframe #n corresponds to, for each UL/DL configuration. To be more specific, the tables of FIG. 7A, FIG. 8A and FIG. 9A show, for each UL/DL configuration, the value of k' when each UL subframe #n transmits an A/N in response to the PDSCH of nearest DL/special subframe #n−k' located the reference value k (k=3, 2 and 1) or more before.

For example, as shown in FIG. 7B, when the above reference value is k=3, an A/N in response to the PDSCH received in DL subframe #0 (=n−k'=3−3) is transmitted in UL subframe #3 of UL/DL configuration 1, based on the value of k' (=3) defined in FIG. 7A. Likewise, in UL subframes #2, #7 and #8, too, A/Ns in response to the PDSCHs received in DL/special subframes indicated by the values of k' defined in FIG. 7A are transmitted.

Also, in FIG. 7B, when a PDSCH is received in special subframe #1, the same HPN as the HPN of special subframe #1 becomes available again in DL subframe #0, which is located three subframes after UL subframe #7, in which an A/N is transmitted in response to this PDSCH. Therefore, the HARQ RTT in UL/DL configuration 1 is nine subframes.

Also, as shown in FIG. 8B, when the above reference value for processing time is k=2, in accordance with the the value of k' (=2) defined in FIG. 8A, in UL subframe #3 of UL/DL configuration 1, an A/N in response to the PDCH received in special subframe #1 (=n−k'=3−2) is transmitted. Likewise, in UL subframes #2, #7 and #8, too, A/Ns in response to the PDSCHs received in DL/special subframes indicated by the values of k' defined in FIG. BA are transmitted.

Also, in FIG. 8B, when a PDSCH is received in DL subframe #4, the same HPN as the HPN of DL subframe #4 becomes available again in DL subframe #9, which is located two subframes after UL subframe #7, in which an A/N is transmitted in response to this PDSCH. Therefore, the HARQ RTT in UL/DL configuration 1 is five subframes.

Also, as shown in FIG. 9B, when the reference value is k=1, in UL subframe #7 of UL/DL configuration 1, A/Ns in response to the PDSCHs received in DL subframes #4 (=n−k'=7−3) and #5 (=n−k'=7−2) and special subframe #6 (=n−k'=7−1) are transmitted based on the values of k' (3, 2 or 1) defined in FIG. 9A. Likewise, in UL subframe #2, too, A/Ns in response to the PDSCHs received in DL/special subframes indicated by the values of k' defined in FIG. 9A are transmitted.

Also, in FIG. 9B, when a PDSCH is received in DL subframe #4, the same HPN as the HPN of DL subframe #4 becomes available again in DL subframe #9, which is the first DL subframe located one or more subframes after UL subframe #7, in which an A/N is transmitted in response to this PDSCH. Therefore, the HARQ RTT in UL/DL configuration 1 is five subframes.

As described above, in the tables shown in FIG. 7A, FIG. 8A and FIG. 9A, a set K', which is comprised of M values of k' {$k'_0, k'_1, \ldots, k'_{M-1}$}, is defined for each UL/DL configuration and for each UL subframe #n. The values of k' are configured based on reference values k, which are made lower than 4 ms, and UL/DL configurations, so that latency can be reduced more than in existing LTE systems.

<Maximum Number of HARQ Processes>

As shown in FIG. 7 to FIG. 9, when, in TDD, the timing for transmitting A/Ns in response to the PDSCH is controlled based on a reference value k that is shorter than 4 ms of existing LTE systems (for example, k=1, 2 or 3 (ms)), the HARQ RTT is controlled based on this reference value k and UL/DL configurations. Also, the maximum number of HARQ processes is equal to the number of UL subframes in the maximum HARQ RTT. Therefore, it is possible to say that the maximum number of the HARQ processes is also controlled based on the UL/DL configuration and the reference value k.

As described above, when the maximum number of HARQ processes is subject to control, the number of bits (bit length) of the HPN field in DL DCI may assume a value to match the maximum number of HARQ processes, or may be a fixed value (for example, four bits, which is the same as the number of HPN field bits in TDD in existing LTE systems.

FIG. 10 provide diagrams to show examples of the maximum numbers of HARQ processes and the numbers of HPN field bits according to the second aspect. As shown in FIGS. 10A to 10C, the maximum number of HARQ processes can be determined based on the above-described reference value k and UL/DL configurations. If the UL/DL configuration is the same, the maximum number of HARQ processes to suit the reference value k (k=1, 2 or 3) is less than the maximum number of HARQ processes in existing LTE systems (see FIG. 3A).

For example, in the case of UL/DL configuration 1, the maximum number of HARQ processes for k=3, 2 and 1 is 5, 3 and 3, respectively, which is smaller than the maximum number of HARQ processes 7 (see UL/DL configuration 1 in FIG. 3A) in existing LTE systems. Also, if the value of the reference value k is the same, the maximum number of HARQ processes is larger in UL/DL configurations in which the proportion of DL subframes is greater (for example, UL/DL configurations 3, 4 and 5).

As shown in FIGS. 10A to 10C, if the maximum number of HARQ processes per UL/DL configuration is controlled to be smaller than in existing LTE systems (FIG. 3A) depending on the value of the reference value k, the number of bits of the HPN field in DL DCI may be an unfixed value that varies with the maximum number of HARQ processes. In this case, the overhead due to DL DCI can be reduced. Note that, the number of bits (bit length) of the HPN field included in DL DCI that is transmitted and received in the common search space of the PDCCH may be a fixed value (for example, four). In this case, the payload of the DL DCI transmitted and received in the common search space does not change, so that, even during periods in which the value of k is changed by higher layer signaling such as RRC signaling, communication can be continued by using DL DCI in the common search space.

Alternatively, the number of bits of the HPN field in DL DCI may be a fixed value (for example, four bits, which is the same as in TDD in existing LTE systems) that does not change with the maximum number of HARQ processes. In this case, existing DL DCI formats can be reused. In addition, when, by making the value of k less than four, an HARQ process number is indicated as being no longer available for use, the user terminal can judge that the user terminal has failed to receive the DL DCI corresponding to this value, and transmit a NACK or DTX.

<Soft Buffer Size>

As described above, when the maximum number of HARQ processes is controlled depending on the reference value k, a user terminal may control the soft buffer size (the number of bits) per HARQ process based on the maximum number of HARQ processes.

To be more specific, the user terminal may make the software buffer size per HARQ process a variable size that changes with the maximum number of HARQ processes, or a fixed size that does not change with the maximum number of HARQ processes. Note that the details of the control of soft buffer size are the same as explained earlier in the first aspect, the explanation thereof will be omitted here.

<Variation>

The tables of FIG. 7A, FIG. 8A and FIG. 9A show the value of k' when each UL subframe #n transmits an A/N in response to the PDSCH of received in nearest DL/special subframe #n−k' that is located the reference value k (k=3, 2 and 1) or more before, for each UL/DL configuration. That is, the value of k' is configured so that, when a PDSCH is received in DL/special subframe #n, an A/N in response to this PDSCH is transmitted in nearest UL subframe #n+k' that is located the reference value k or more later. In this case, it is likely that A/N transmission timings concentrate in specific UL subframes.

For example, UL subframe #2 of UL/DL configurations 3, 4 and 5 in FIG. 7A and FIG. 8A and FIG. 9A has to transmit A/Ns in response to five or more DL/special subframes in a bundle. Therefore, according to a variation of the second aspect, the timing k' for transmitting A/Ns may be determined in consideration of UL overhead.

FIG. 11 to FIG. 13 are diagrams to show examples of A/N transmission timings according to the second aspect. In FIG. 11 to FIG. 13, the user terminal transmits, in UL subframe #n, an A/N in response to the PDSCH received in DL/special subframe #n–k', which is located the reference value k or more before UL subframe #n (and which does not necessarily have to be the nearest subframe). FIG. 11, FIG. 12, and FIG. 13 show cases where the above reference value k is 3 ms, 2 ms, and 1 ms, respectively.

The tables of FIG. 11, FIG. 12 and FIG. 13 show the value of k' when UL subframe #n transmits an A/N in response to the PDSCH of DL/special subframe #n–k' located the reference value k (K=3, 2 and 1) or more before, for each UL/DL configuration. The value of k' is determined based on UL overhead, in addition to the reference value k and the UL/DL configuration.

Figure 14A:
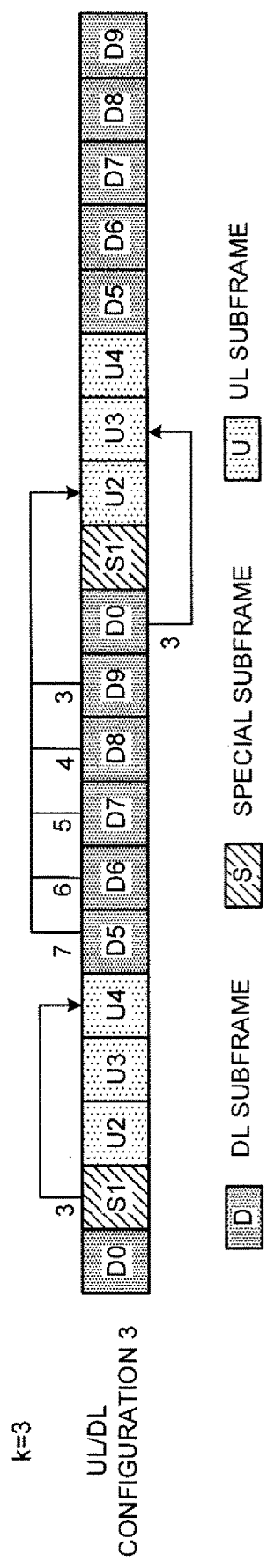
FIGS. 14A and 14B are diagrams to show examples of preventing concentration of UL overhead according to a variation of the second aspect.

In FIG. 11, FIG. 12 and FIG. 13, the value of k' in UL subframe #n of at least part of the UL/DL configurations is configured to different values from those in FIG. 7A, FIG. 8A and FIG. 9A. For example, the table shown in FIG. 7A specifies that A/Ns in response to five DL/special subframes are transmitted in UL subframe #2 of UL/DL configuration 3, and an A/N in response to one DL/special subframe is transmitted in both UL subframes #3 and #4. Thus, in the table shown in FIG. 7A, UL overhead is concentrated in UL subframe #2 of UL/DL configuration 3 (see FIG. 14A).

Figure 14B:
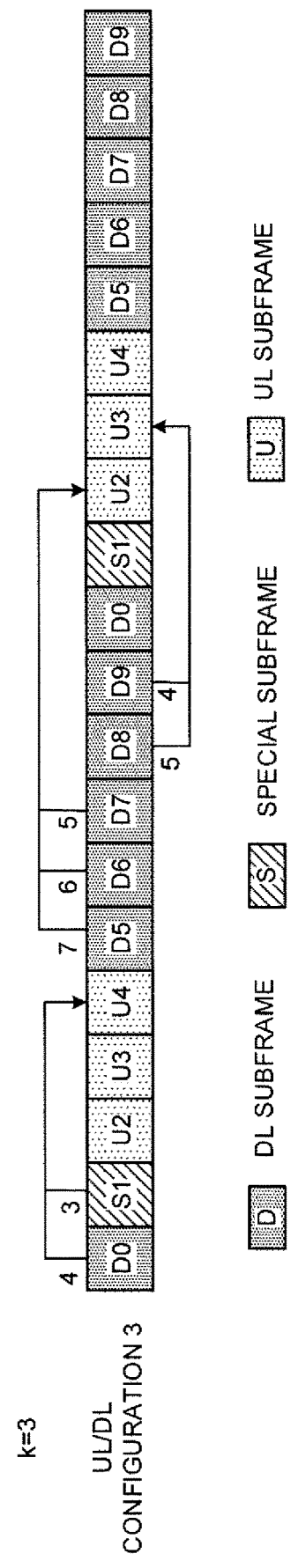

Meanwhile, the table shown in FIG. 11 specifies that A/Ns in response to three DL/special subframes are transmitted in UL subframe #2 of UL/DL configuration 3, A/Ns in response to two DL/special subframes are transmitted in UL subframe #3, and A/Ns in response to two DL/special subframes are transmitted in UL subframe #4. According to the table shown in FIG. 11, A/Ns are distributed over UL subframes #2 to 4 of each UL/DL configuration (see FIG. 14B), so that it is possible to prevent UL overhead from concentrating in UL subframe #2.

Now, according to the second aspect of the present invention described above, in the event the reference value k is controlled to be shorter than 4 ms, the transmission of PUSCH can be controlled properly based on A/N transmission timings k' that are determined based on this reference values k.

Also, according to the second aspect, the reference value k used to control the timing for transmitting A/Ns is lowered, so that latency can be reduced while keeping subframes (1-ms TTIs) as processing units in communication control. In addition, since the maximum number of HARQ processes can be reduced with the lowering of the reference value k, the overhead of DL DCI due to HPN fields can be reduced.

(Third Aspect)

With a third aspect of the present invention, control for switching the reference value k will be described below. Note that the third aspect can be combined with the first and/or the second aspect.

According to the third aspect, the reference value k may be designated explicitly through higher layer signaling and/or physical layer signaling, or may be designated implicitly.

<Semi-Static Signaling>

Figure 15:
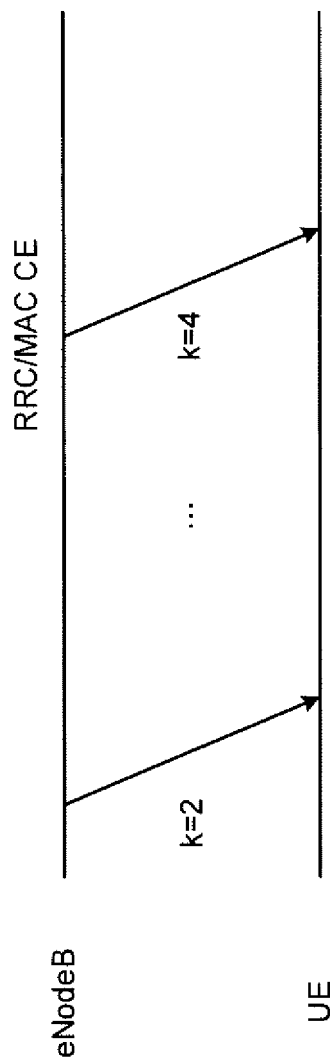
FIG. 15 is a diagram to show an example of semi-static signaling according to a third aspect of the present invention.

FIG. 15 is a diagram to show an example of semi-static signaling according to the third aspect. As shown in FIG. 15, information to represent the above reference value k may be reported from a radio base station to a user terminal through higher layer signaling such as, for example, RRC (Radio Resource Control) signaling and/or MAC (Medium Access Control) signaling. The user terminal may determine the timing for transmitting an A/N based on the reference value k indicated by this piece of information.

For example, in FIG. 15, after a reference value k (=2) that is lower than that of existing LTE systems is configured, the same reference value k (=4) as that of existing LTE systems is re-configured. Note that, although not illustrated, it is possible to use the same assumed value k (=4) as that of existing LTE systems up to a predetermined timing, such as the timing for gaining initial access based on random access procedures, and, after this predetermined timing (for example, after initial access is completed), reconfigure reference value that is shorter than that of existing LTE systems (for example, one of k=1, 2 and 3).

Note that, when an RRC release or a radio link failure occurs, the value of k reported in higher layer signaling may be reset to the value of k for existing LTE. Furthermore, as for the value of k, the value of k in existing LTE may be used unless otherwise indicated. By this means, even in an environment with poor conditions for communication, it is possible to restart from communication control for existing LTE.

<Dynamic and Explicit Signaling>

FIG. 16 are diagrams to show examples of dynamic and explicit signaling according to the third aspect. As shown in FIG. 16, an information field to indicate the reference value k may be newly provided in the DCI reported by physical layer signaling.

For example, when 1, 2, 3 and 4 are used as reference values k, the number of bits (bit length) of the information field may be two. Note that, the association between the bit value shown in FIG. 16 and the value of k is only an example, but these are not limiting.

Here, DCI containing the above information field may be DCI that is specific to each user terminal (for example, DL assignment for use for PDSCH scheduling) or DCI that is shared in common by a plurality of user terminals (for example, cell-specific DCI).

The DCI that is shared in common is placed in a common search space (CSS). Also, the CRC (Cyclic Redundancy Check) that is appended to this common DCI may be scrambled by user terminal-specific RNTIs (Radio Network Temporary Identifiers). If the above information field is included in the common DCI, the same A/N transmission timing is used by a number of user terminals that detect the common DCI.

Note that the reference value k which the above information field value indicates may be applied to all component carriers (CC) configured in the user terminal, or may be applied to only part of the CCs. Also, the reference value k may be applied to the timing for transmitting A/Ns in response to PDSCH, and/or applied to the time it takes, after a UL grant is received, until PUSCH is transmitted. Furthermore, the reference value k may be applied to a plurality of subframes, or may be applied only to a single subframe.

<Dynamic and Implicit Signaling>

In existing LTE systems, the number of HPN field bits in DCI is three bits in FDD, and four bits in TDD. Meanwhile, as mentioned earlier in the first aspect, when FDD is used, the maximum number of HARQ processes is smaller than that in existing LTE system, which is eight. Also, as mentioned earlier in the second aspect, in TDD, the maximum number of HARQ processes in each UL/DL configuration is smaller than in existing LTE systems if the UL/DL configuration is the same.

It then follows that HPN field values that become no longer available for use when the maximum number of HARQ processes decreases may be used to implicitly indicate whether the reference value k is four, or less than four.

Also, when k<4 and k=4 hold, different HPN field values may indicate a common HPN (first method). According to the first method, the maximum number of HARQ processes that can be assigned is min {the maximum number of HARQ processes for when k<4 (for example, k=1), the maximum number of HARQ processes for when k=4}. For example, in the event UL/DL configuration 3 applies, the maximum number of HARQ processes that can be assigned is min {7, 9}=7. In this case, when the HPN field value is 0 to 6, this may indicate k<4, and one of HPN 0 to 6 may be indicated. When the HPN field value is 9 to 15, this may indicate k=4, and one of HPN 0 to 6 may be indicated.

According to the first method described above, common HPNs can be assigned when k<4 and when k=4, so that, when data that has been assigned an HPN once is transmitted again, a different value of k can be designated. However, the maximum number of HARQ processes that can be assigned is limited to the minimum one of the numbers of HARQ processes for k=1 to 4 (for example, seven for UL/DL configuration 3).

Alternatively, different HPNs may be designated by different HPN field values when k<4 and when k=4 (second method). According to the second method, the maximum number of HARQ processes that can be assigned is the sum of the maximum number of HARQ processes for when k<4 and the maximum number of HARQ processes for when k=4. According to the second method described above, it is not possible to designate a different value of k when retransmitting data to which an HPN has been assigned once.

FIG. 17 is a diagram to show examples of dynamic and explicit signaling according to the third aspect. Assuming TDD, FIG. 17 shows the maximum numbers of HARQ processes for when k=1 to 4 and the HPN values that are used when k=1 to 4 in the second method, per UL/DL configuration. Assume that, in FIG. 17, the number of HPN field bits is four.

In UL/DL configuration 3 of FIG. 17, when the HPN field value is 0 to 6, this may indicate k<4, and one of HPN 0 to 6 may be indicated. When the HPN field value is 7 to 15, this may indicate k=4, and one of HPN 7 to HPN 15 may be indicated.

Here, when the sum of the maximum number of HARQ processes when k<4 (for example, the maximum number of HARQ processes for when k=3) and the maximum number of HARQ processes for when k=4 exceeds sixteen, which is the number of HPNs that can be represented by the HPN field values of four bits, the maximum number of HARQ processes for when k=4 may be limited. Meanwhile, the maximum number of HARQ processes for when k<4 is not limited.

For example, referring to UL/DL configuration 4 of FIG. 17, the maximum number of HARQ processes that can be assigned is 22, which is the sum of the maximum number 10 of HARQ processes at k=3 and the maximum number 12 of HARQ processes at k=4, but this sum, 22, cannot be designated by the four-bit HPN field. Therefore, as shown in FIG. 17, in the event of k=4, the number of HARQ processes is limited to five, and five HARQ processes are indicated by the HPN field values 10 to 15.

Similarly, in UL/DL configurations 2 and 5, the HARQ process that can be used at k=4 is limited, but the maximum number of HARQ processes that can be used at k<4 is not limited.

Note that, in the above first and second methods, whether k is 1, 2 or 3 when k<4 may be indicated by higher layer signaling.

Also, if different HPN field values are used for each value of k, the value of k can be indicated by the HPN field value (third method). FIG. 18 is a diagram to show examples of dynamic and explicit signaling according to the third aspect. FIG. 18 shows the maximum number of HARQ processes in the event of k=1 to 4 and the HPN values that are used when k=1 to 4 in the third method, for each of UL/DL configurations 0, 1 and 6. Note that, in FIG. 18, the number of HPN field bits is four.

As shown in FIG. 18, in UL/DL configuration 0, different HPN field values are assigned for each value of k. Therefore, when UL/DL configuration 0 is used, the value of k can be implicitly indicated by using the HPN field value.

Meanwhile, when UL/DL configurations 1 and 6 are used, if an HPN field value is assigned to every one of the HARQ processes for k=1 to 4, the HPN field values run short. Therefore, in UL/DL configurations 1 and 6, HPN field values may be assigned only to some of the values of k. For example, UL/DL configurations 1 and 6 of FIG. 18 show cases where HPN field values are assigned to k=1, 2 and 4, and cases where HPN field values are assigned to k=1, 3 and 4. Note that FIG. 18 only shows examples, and, HPN field values may be assigned only to part of the values of k when other UL/DL configurations are used.

In the third method, one or more prospective values of k may be designated by higher layer signaling. For example, when UL/DL configuration 0 of FIG. 18 is used, higher layer signaling may indicate that 1, 2, 3 and 4 are prospective values of k. Likewise, when UL/DL configuration 1 or 6 is used, higher layer signaling may indicate that 1, 2 and 4, or 1, 3 and 4 are prospective values of k.

Note that the use of implicit signaling is not limited to when the above HPN field values are used. This implicit signaling might use at least one of the search space where DCI is placed, the transport block size (TBS) applied to the PDSCH, the method of CRC scrambling, and the number of prospective search spaces, may be used.

For example, the reference value k may be indicated implicitly depending on in which search space DCI is placed. To be more specific, placing DCI in a common search space may serve as an implicit indication of k=4, and placing DCI in a user terminal-specific search space may serve as an implicit indication of k<4.

Also, the reference value k may be designated implicitly depending on which TBS is applied to the PDSCH. For example, it may be determined in advance that a TBS that is greater than or equal to a first threshold may serve as an implicit indication of k=4, a TBS that is greater than or equal to a second threshold and less than the first threshold may serve as an implicit indication of k=3, and a TBS that is greater than or equal to a third threshold and less than the second threshold may serve as an implicit indication of k=2.

In addition, the reference value k may be designated implicitly depending on which RNTI is used to scramble CRC. To be more specific, CRC may be scrambled using different RNTIs for each reference value k.

Also, the aggregation level (AL) of control channel elements (CCEs) forming the search space may indicate the reference value k implicitly. For example, k=4 holds if the AL of CCEs is 1 or 4, and k=3 holds if the AL of CCEs is 2 or 8. Also, k=4 holds if the AL of CCEs is an odd number, and k=3 holds if the AL of CCEs is an even number.

(Others)

Although the second aspect above has described examples of A/N transmission timings in the event existing UL/DL configurations 0 to 6 are used, even when UL/DL configurations 0 to 6 that are different from existing ones are used, the present embodiment is still applicable only if the values of k' in the tables shown in FIG. 7A, FIG. 8A, FIG. 9A, FIG. 11, FIG. 12, and FIG. 13 are changed as appropriate.

Also, in the dynamic signaling described in the third aspect, explicit signaling and implicit signaling may be combined depending on UL/DL configurations. For example, in UL/DL configurations 4 and 5 where the proportion of DL subframes is relatively large compared to UL subframes, the information field in DCI may indicate the value of k explicitly. Also, in other UL/DL configurations 0 to 3 and 6, k may be implicitly indicated by using HPN field values.

Also, although cases have been described above with the first to third aspects where the reference value k is controlled when 1-ms TTIs (subframes) are used, the first to third aspects can be also properly applied to cases where the reference value k is not a fixed value but is an unfixed value when short TTIs, which are shorter than 1 ms, are used.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 19:
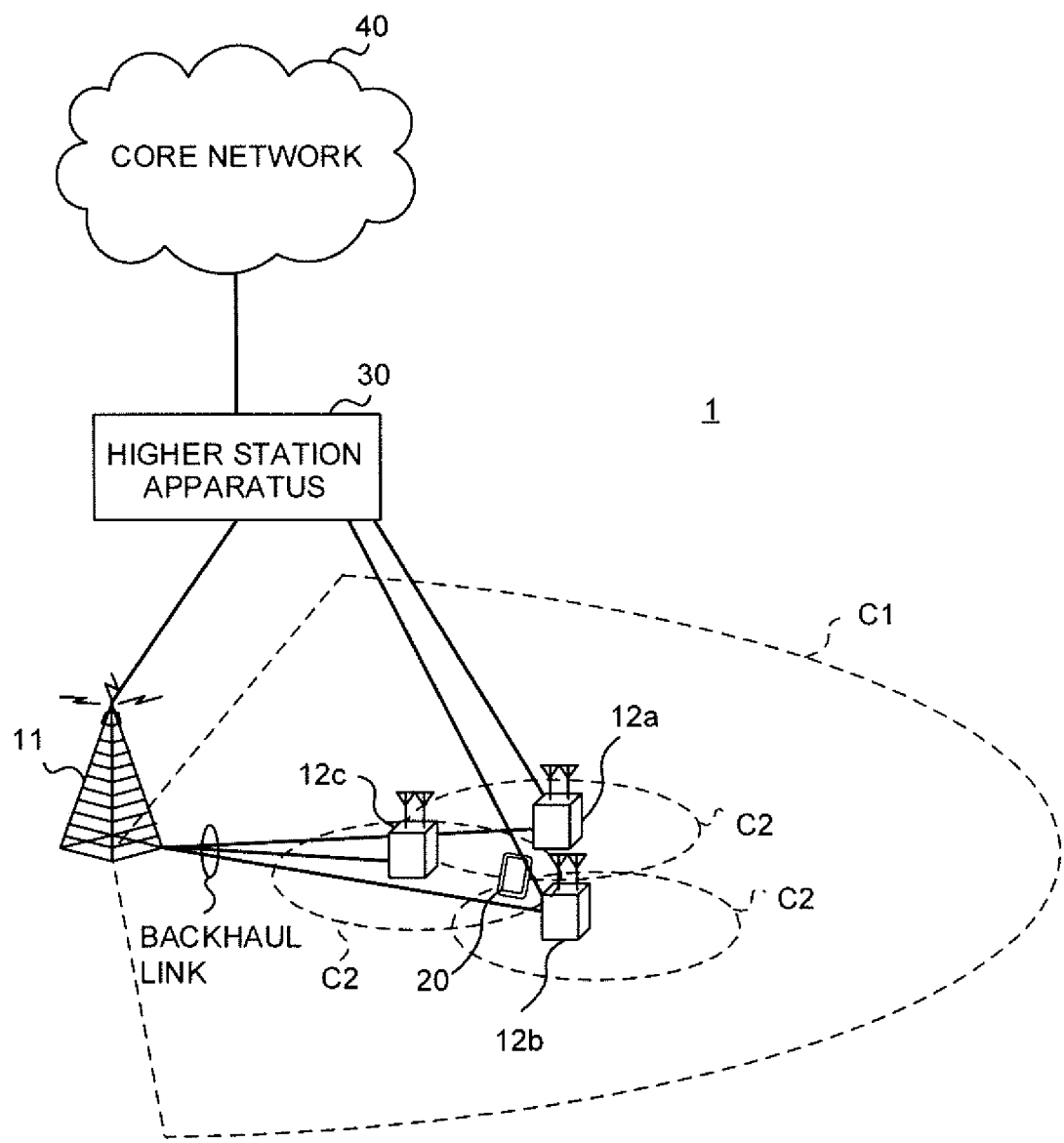
FIG. 19 is a diagram to show an exemplary schematic structure of a radio communication system according to the present embodiment.

FIG. 19 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 19 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. As used herein, "numerology" refers to frequency-domain and time-domain parameters, such as subcarrier spacing, symbol duration, cyclic prefix duration, subframe duration and so on.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless indicated otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of A/N, NDI, HPN, and redundancy version (RV)) pertaining to UL signals (for example, PUSCH) can be communicated using at least one of the PHICH, the PDCCH, and the EPDCCH.

UL channels that are used in the radio communication system 1 include a UL shared channel that is shared by each user terminal 20 (also referred to as "PUSCH (Physical Uplink Shared CHannel)," "UL data channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N) for DL signals (for example, PDSCH), channels state information (CSI), and a scheduling request (SR) is communicated in the PUSCH or the PUCCH. By means of the PRACH, random access preambles for establishing connections with cells are communicated.

(Radio Base Station)

Figure 20:
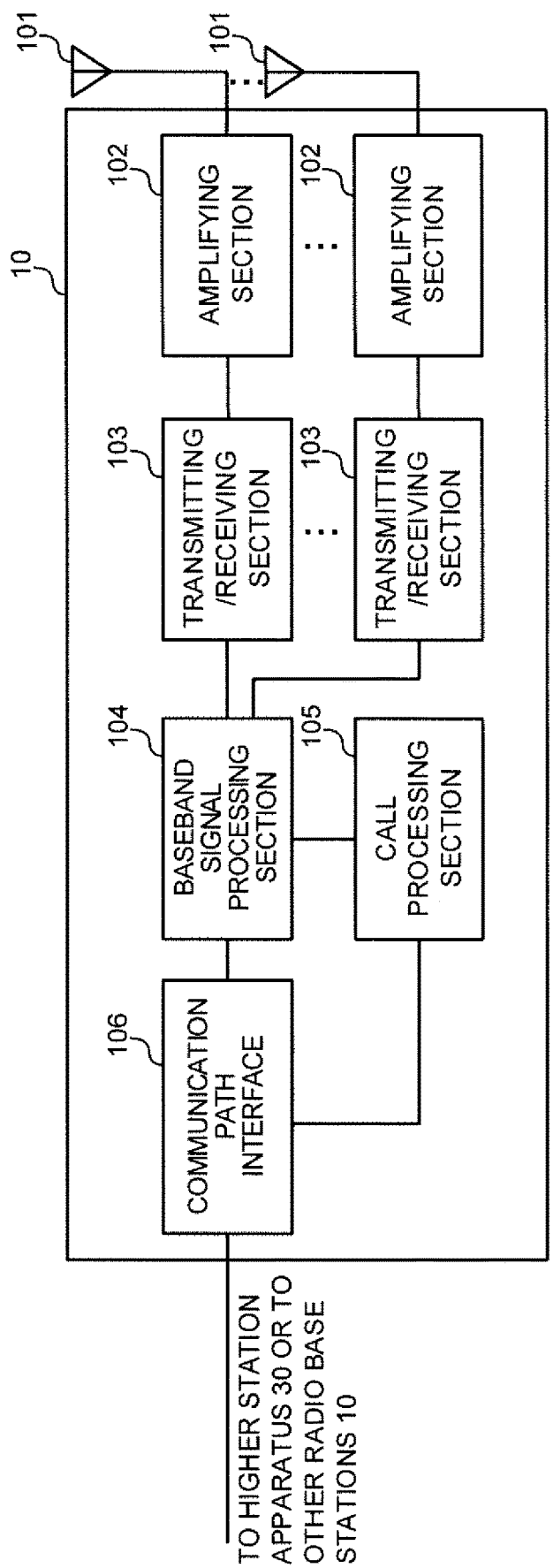
FIG. 20 is a diagram to show an exemplary overall structure of a radio base station according to the present embodiment.

FIG. 20 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

In addition, the transmitting/receiving sections 103 transmit DL DCI (also referred to as "DL assignment" and/or the like) for scheduling a DL shared channel (for example, PDSCH) and this DL shared channel. The DL DCI may include at least one of an HPN field, an NDI, and an RV. In addition, the transmitting/receiving sections 103 receive UCI that includes retransmission control information (for example, an A/N) in response to the DL shared channel. This UCI is transmitted via the PUCCH or the PUSCH.

In addition, the transmitting/receiving sections 103 may transmit information that represents the reference value k for the timing for transmission in the radio base station 10 and/or user terminals 20 (third aspect).

Figure 21:
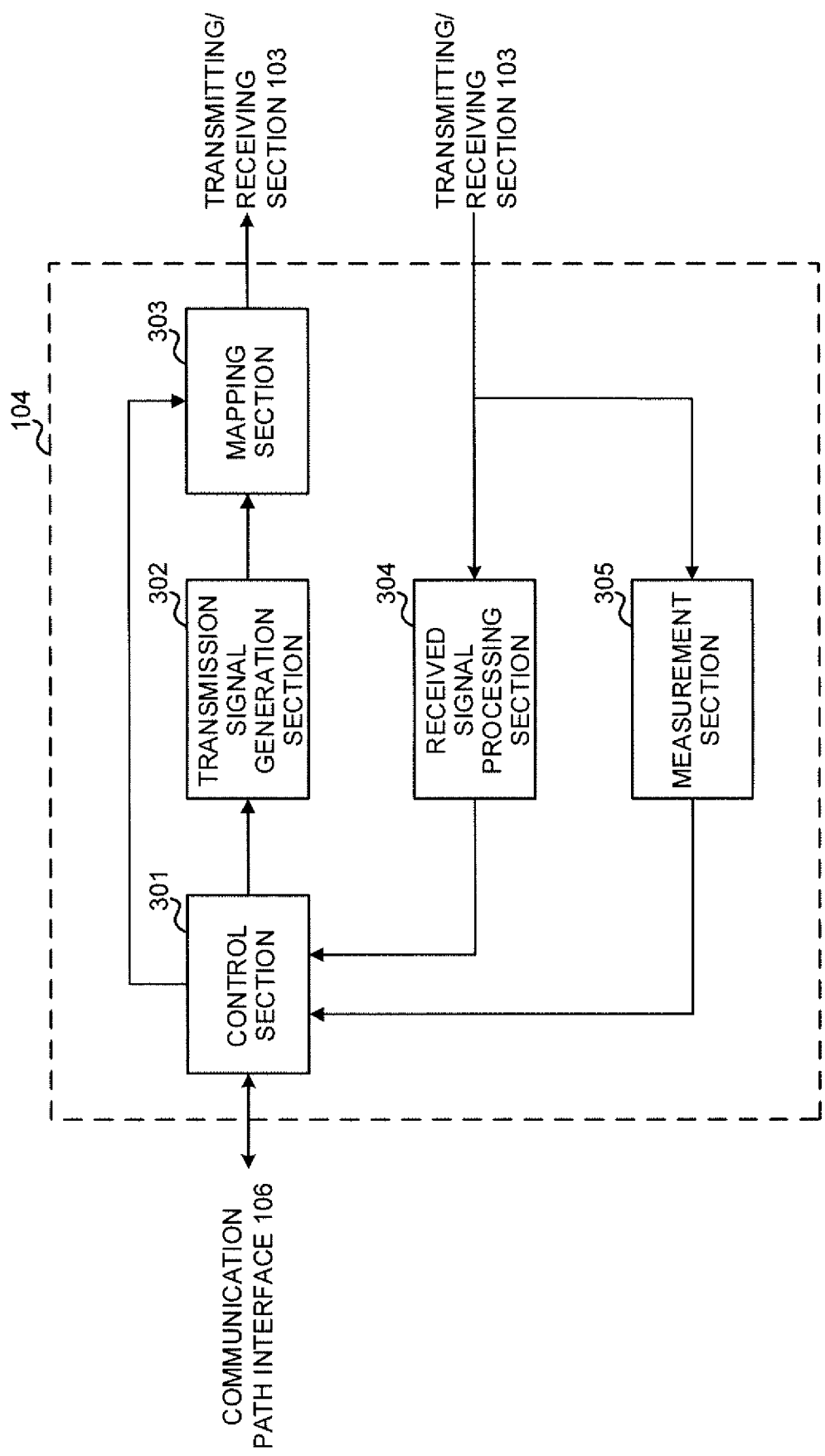
FIG. 21 is a diagram to show an exemplary functional structure of a radio base station according to the present embodiment.

FIG. 21 is a diagram to show an exemplary functional structure of a radio base station according to the present embodiment. Note that, although FIG. 21 primarily shows functional blocks that pertain to characteristic parts of the present embodiment, the radio base station 10 has other functional blocks that are necessary for radio communication as well. As shown in FIG. 21, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for user terminals 20. For example, the control section 301 schedules the PUSCH and/or the PDSCH for the user terminals 20.

Also, the control section 301 may also controls the reference value k in the radio base station 10 and/or user terminals 20, and control the receipt of A/Ns receipt in timings (subframe) that are determined based on the reference value k (first and second aspects).

When FDD is used, the control section 301 may exert control so that an A/N in response to the PDSCH in subframe #n−k is received in subframe #n (in other words, the control section 301 may exert control so that an A/N in response to the PDSCH in subframe #n is received in subframe #n+k) (first aspect).

When TDD is used, the control section 301 may control the receipt of A/Ns at timings (subframes) that are determined based on reference values k and UL/DL configurations (second aspect). When TDD is used, the control section 301 may exert control so that an A/N in response to the PDSCH of subframe #n−k' is received in subframe #n (in other words, the control section 301 may determine the timing of receiving the A/N in response to the PDSCH transmitted in subframe #n as subframe #n+k').

Here, the value of k' (A/N-receiving timing) is determined based on the reference value k (for example, k=1, 2, 3 or 4) in the radio base station 10 and/or the user terminals 20, and the UL/DL configuration (see, for example, FIG. 3A, FIG. 7A, FIG. BA and FIG. 9A). Also, the value of k' may be determined based on UL overhead, in addition to the reference value k and the UL/DL configuration (for example, FIG. 11, FIG. 12 and FIG. 13). The control section 301 may switch the table for looking up the value of k' when the reference value k changes.

Also, the control section 301 may control the maximum number of HARQ processes based on the reference value k (first and second aspect). Note that DL DCI that allocates PDSCH may include an HPN field that indicates an HPN, and the bit length of the HPN field may be an unfixed value that varies with the maximum number of HARQ processes, or may be a fixed value that does not vary with the maximum number of processes.

Furthermore, the control section 301 may control retransmission of the PDSCH based on retransmission control information from the user terminal 20. In addition, the control section 301 may control re-transmission timing of PDSCH based on the above reference value k.

The control section 301 can be constituted by a controller, a control circuit or control apparatus that can be described based on general understanding of the technical field to which the present invention pertains.

The transmission signal generation section 302 generates DL signals (including DL data, DCI, UL data retransmission control information, higher layer control information, etc.) based on commands from the control section 301, and outputs these signals to the mapping section 303.

The transmission signal generation section 302 can be constituted by a signal generator, a signal generating circuit or signal generating apparatus that can be described based on general understanding of the technical field to which the present invention pertains.

Based on commands from the control section 301, the mapping section 303 maps the DL signals generated in the transmission signal 20o generation section 302 (for example, DL data, DCI, UL data re-transmission control information, higher layer control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and/or other processes) on UL signals (for example, UL data, UCI and so forth) transmitted from the user terminals 20. To be more specific, the received signal processing section 304 performs receiving processes on UL signals based on the numerology configured in the user terminals 20. To be more specific, the received signal processing section 304 may output the received signals and/or the signals after receiving processes to the measurement section 305. In addition, the received signal processing section 304 performs receiving processes on A/Ns in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 22:
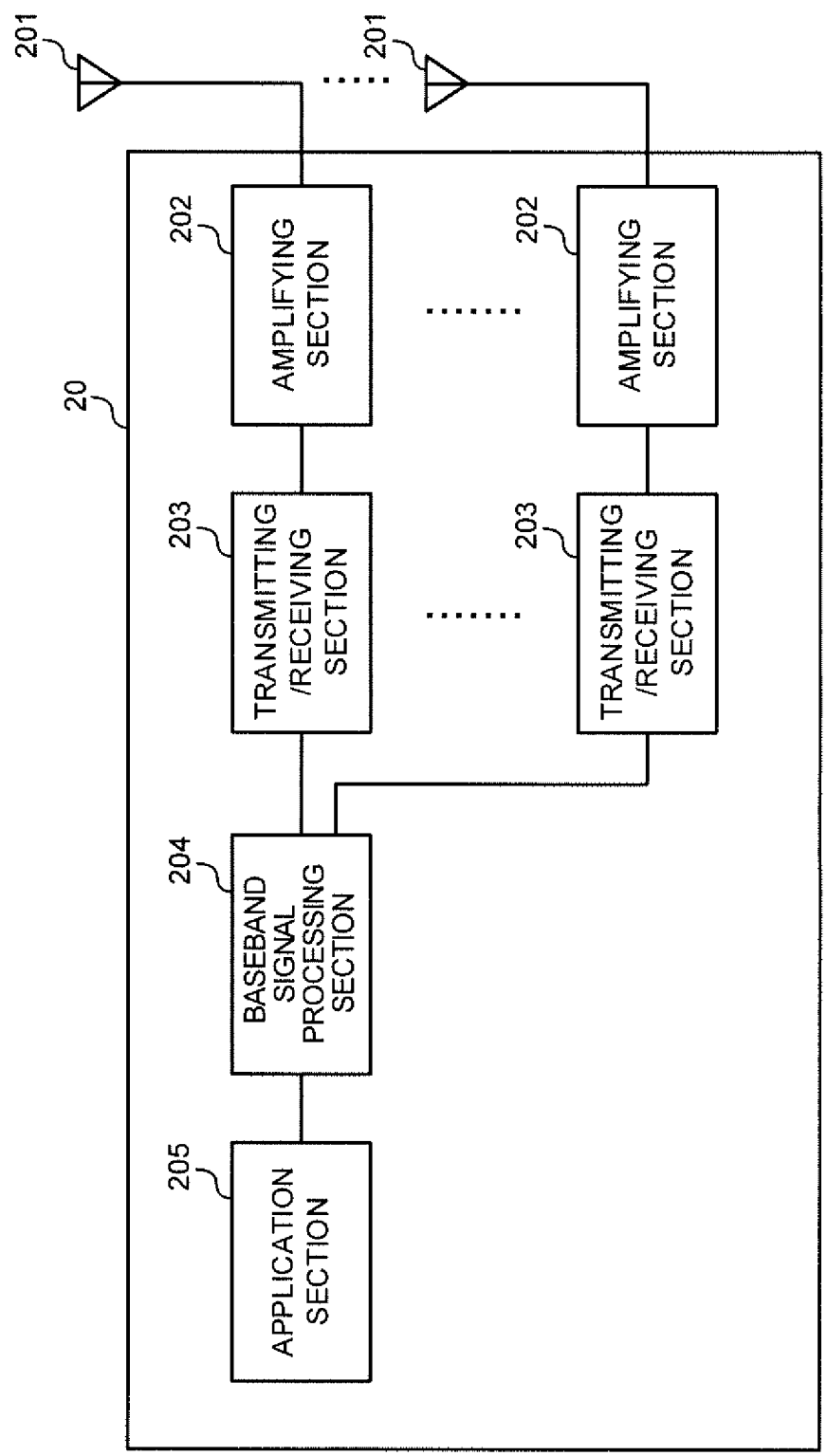
FIG. 22 is a diagram to show an exemplary overall structure of a user terminal according to the present embodiment.

FIG. 22 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and an SR) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DL DCI (also referred to as "DL assignment" and/or the like) for scheduling a DL shared channel (for example, PDSCH), and this DL shared channel. In addition, the transmitting/receiving sections 203 transmit the UL shared channel following commands from the control section 401.

Also, the transmitting/receiving sections 203 may receive information that represents the reference value k for the timing for transmission in the radio base station 10 and/or user terminals 20 and/or the retransmission control scheme (third aspect).

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 23:
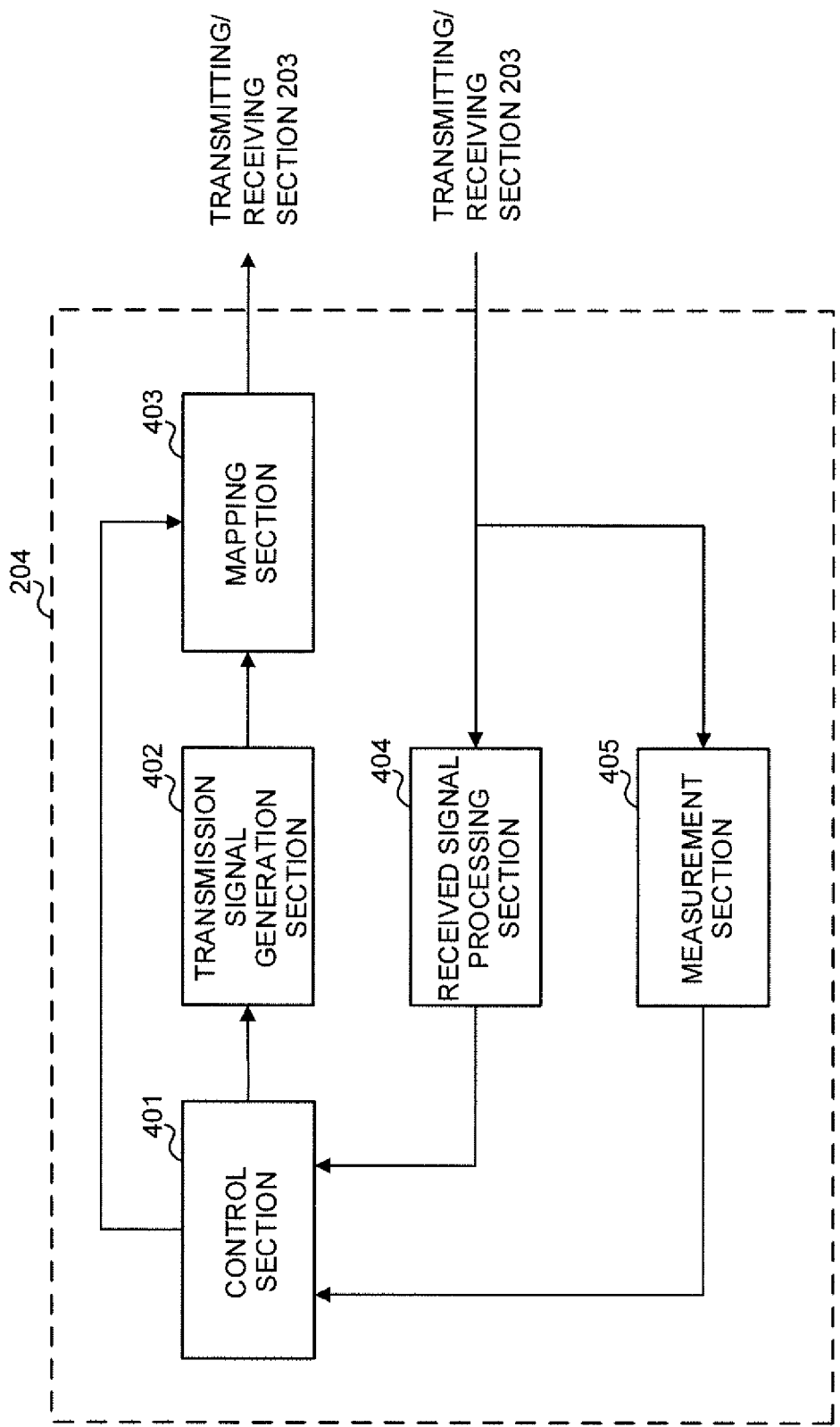
FIG. 23 is a diagram to show an exemplary functional structure of a user terminal according to the present embodiment.

FIG. 23 is a diagram to show an exemplary functional structure of a user terminal according to the present embodiment. Note that, although FIG. 23 primarily shows functional blocks that pertain to characteristic parts of the present embodiment, the user terminal 20 has other functional blocks that are necessary for radio communication as well. As shown in FIG. 23, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

The control section 401 controls receipt of PDSCH and/or transmission of PUSCH based on DCI from the radio base station 10. Furthermore, the control section 401 may control the reference value k in the radio base station 10 and/or the user terminals 20, determine the timings (subframes) to transmit A/Ns based on the reference value k, and control the transmission of A/Ns at these transmission timings (first and second aspects).

When FDD is used, the control section 401 may exert control so that an A/N in response to the PDSCH in subframe #n–k is transmitted in subframe #n (in other words, the control section 401 may determine the timing for transmitting an A/N in response to the PDSCH received in subframe #n, to be subframe #n+k) (first aspect).

In the event TDD is used, the control section 401 may control the timing for transmitting A/Ns in response to the PDSCH based on the reference value k and UL/DL configurations (second aspect). When TDD is used, the control section 401 may control the transmission of an A/N in response to the PDSCH in subframe #n–k' in subframe #n (in other words, the control section 401 may determine the timing for transmitting an A/N in response to the PDSCH received in subframe #n to be subframe #n+k').

Here, the value of k' (A/N-transmission timing) is determined based on the reference value k (for example, k=1, 2, 3 or 4) and the UL/DL configuration in the radio base station 10 and/or the user terminals 20 (see, for example, FIG. 3A, FIG. 7A, FIG. 8A and FIG. 9A). Also, the value of k' may be determined based on UL overhead, in addition to the above reference value k and the UL/DL configuration (for example, FIG. 11, FIG. 12 and FIG. 13). The control section 401 may switch the table for looking up the value of k' when the reference value k changes.

Also, the control section 401 may control the maximum number of HARQ processes based on the reference value k (first and second aspect). Note that DL DCI that allocates PDSCH may include an HPN field that indicates an HPN, and the bit length of the HPN field may be an unfixed value that varies with the maximum number of HARQ processes, or may be a fixed value that does not vary with the maximum number of processes.

In addition, the control section 401 may control the soft buffer size per HARQ process based on the reference value k. To be more specific, the control section 401 may make the software buffer size per HARQ process a variable size that changes with the maximum number of HARQ processes, or a fixed size that does not change with the maximum number of HARQ processes.

The control section 401 can be constituted by a controller, a control circuit or control apparatus that can be described based on general understanding of the technical field to which the present invention pertains.

The transmission signal generation section 402 generates UL signals (including UL data, UCI, UL reference signals and so forth) as commanded from the control section 401 (the generation collectively referring to, for example, performing processes such as encoding, rate matching, puncturing, modulation, and/or other processes), and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so forth) for DL signals (DL data, DCI, higher layer control information, and so on). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 24:
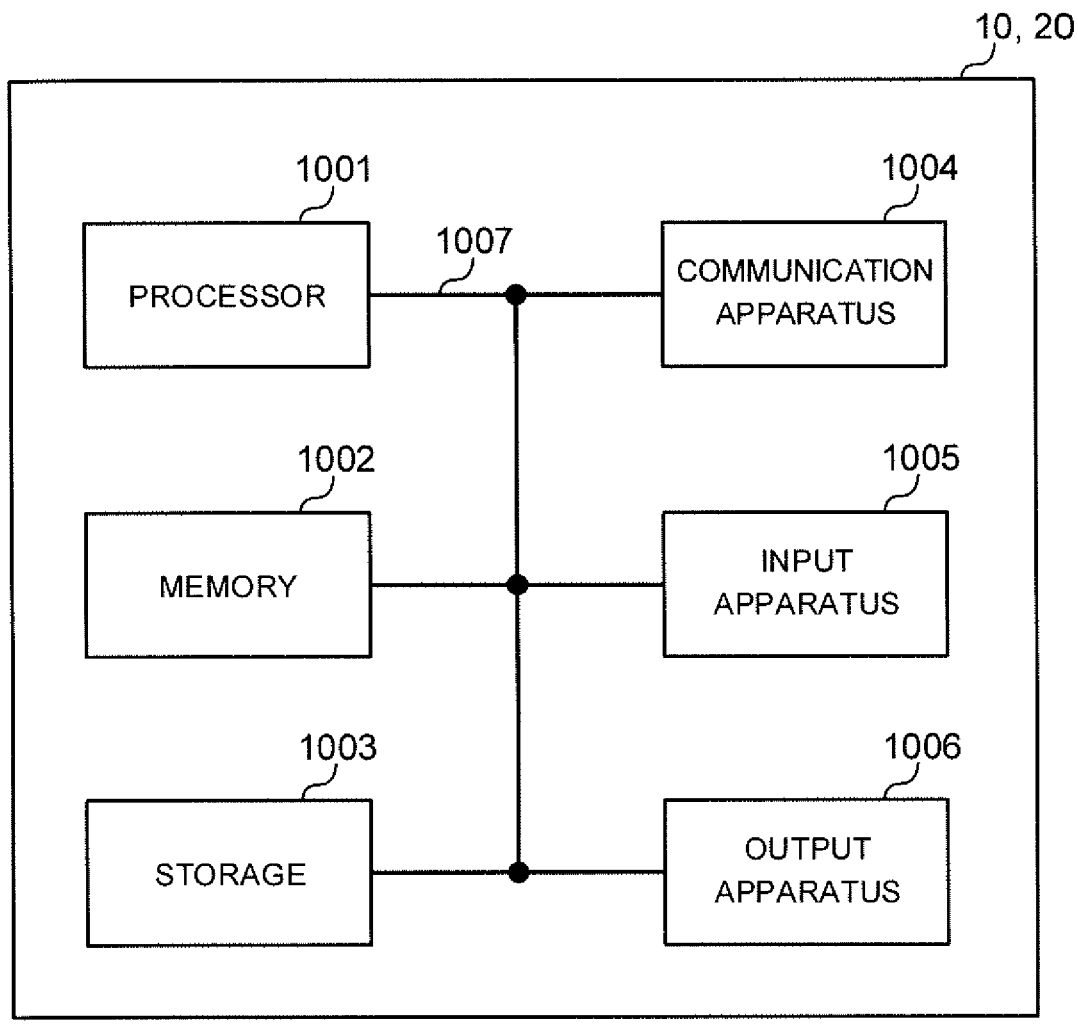
FIG. 24 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 24 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on).

Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit to use when communicating signals. A radio frame, a subframe, a slot and a symbol may be each called by other equivalent names. For example, one subframe may be referred to as a "transmission time interval (TTI)," or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations such as the number of subframes included in a radio frame, the number of slots included in a subframe, the number of symbols and RBs included in a slot, the number of subcarriers included in an RB, the number of symbols in a TTI, the duration of symbols and the duration of cyclic prefixes (CPs) can be changed in a variety of ways.

Also, the information and parameters described in this specification may be represented in absolute values or in relative values with respect to predetermined values, or may be represented in other information formats. For example, radio resources may be indicated by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise indicated. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

Japanese Patent Application No. 2016-170058, filed on Aug. 31, 2016, including the specifications, drawings and abstracts, are incorporated herein by reference in their entirety.

The invention claimed is:

1. A terminal comprising:
a receiver that receives a downlink (DL) shared channel;
a processor that determines a reference value for a transmission timing of retransmission control information in response to the DL shared channel based on indication information configured by higher layer signaling; and
a transmitter that transmits the retransmission control information based on the reference value,
wherein the indication information includes a one or more prospective values to be the reference value, and
wherein a number of bits in a given field of downlink control information (DCI) to schedule the DL shared channel is determined based on the number of prospective values.

2. A radio communication method for a terminal, comprising:
receiving a downlink (DL) shared channel;
determining a reference value for a transmission timing of retransmission control information in response to the DL shared channel based on indication information configured by higher layer signaling; and
transmitting the retransmission control information based on the reference value,
wherein the indication information includes a one or more prospective values to be the reference value, and
wherein a number of bits in a given field of downlink control information (DCI) to schedule the DL shared channel is determined based on the number of prospective values.

3. A base station comprising:
a transmitter that transmits a downlink (DL) shared channel, and transmits indication information, by higher layer signaling, that indicates a reference value for a transmission timing of retransmission control information in response to the DL shared channel; and
a processor that controls to receive the retransmission control information transmitted based on the reference value,
wherein the indication information includes a one or more prospective values to be the reference value, and
wherein a number of bits in a given field of downlink control information (DCI) to schedule the DL shared channel is determined based on the number of prospective values.

4. A system comprising a base station and a terminal, wherein:
the base station comprises:
a first transmitter that transmits a downlink (DL) shared channel, and transmits indication information, by higher layer signaling, that indicates a reference value for a transmission timing of retransmission control information in response to the DL shared channel; and
a first processor that controls to receive the retransmission control information transmitted based on the reference value, and
the terminal comprises:
a receiver that receives the DL shared channel;
a second processor that determines the reference value based on the indication information; and
a second transmitter that transmits the retransmission control information based on the reference value,
wherein the indication information includes a one or more prospective values to be the reference value, and
wherein a number of bits in a given field of downlink control information (DCI) to schedule the DL shared channel is determined based on the number of prospective values.

* * * * *